United States Patent
Hartmann

[15] 3,673,394
[45] June 27, 1972

[54] MEASURING METHOD AND APPARATUS

[72] Inventor: Frederick Hartmann, Rolling Hills Estates, Calif.

[73] Assignee: North American Rockwell Corporation

[22] Filed: Feb. 18, 1969

[21] Appl. No.: 800,179

[52] U.S. Cl....................................235/151.3, 250/60, 250/65
[51] Int. Cl. ........................................................G01n 23/04
[58] Field of Search................250/59, 83.3 D, 65, 60, 151.3,

[56] References Cited

UNITED STATES PATENTS 2,770,719 11/1956 Simjian...................................250/65 X
2,884,528 4/1959 Kazan.......................................250/60
3,108,186 10/1963 Flarell, Jr..................................250/65

*Primary Examiner*—Malcolm A. Morrison
*Assistant Examiner*—Edward J. Wise
*Attorney*—William R. Lane, Allan Rothenberg and Richard D. Seibel

[57] ABSTRACT

Measurement of the shape, location, and density of a hidden object is provided by passing energy such as X-rays through the object in two mutually angulated directions and measuring the changes in energy. The measured changes in the two directions are then combined to reconstruct the shape of the hidden object. Details of a number of reconstruction techniques are set forth. There is disclosed a reconstruction by hand; the basis for reconstruction by a general purpose computer; a special purpose computer for shape reconstruction; and an alternative solution which may be by hand or by computer.

17 Claims, 55 Drawing Figures

PATENTED JUN 27 1972 3,673,394
SHEET 1 OF 9
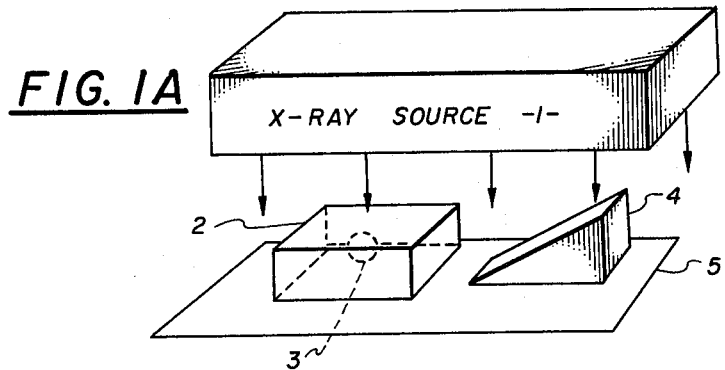
FIG. IA
FIG. IB
FIG. IC
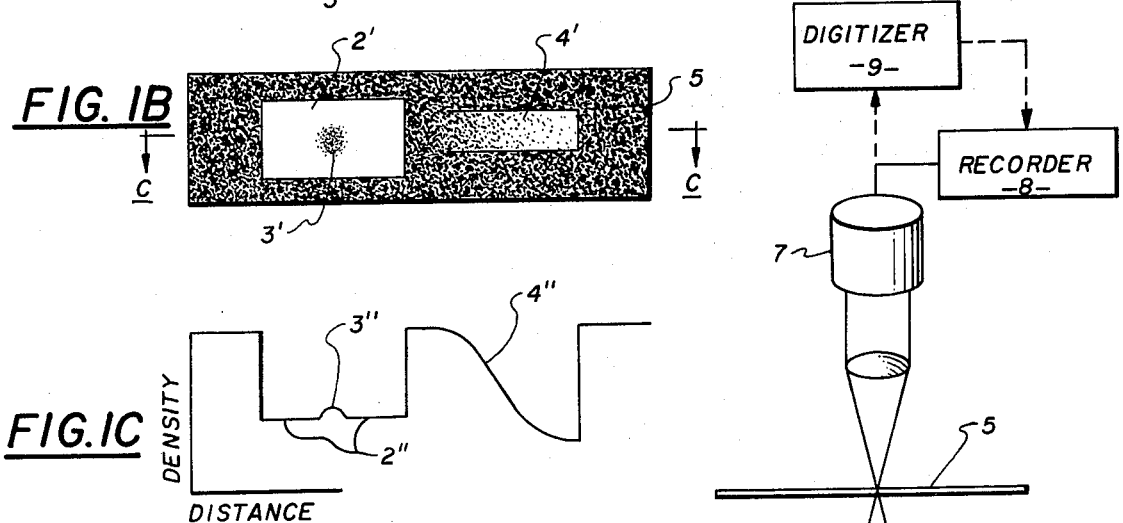
FIG. 2
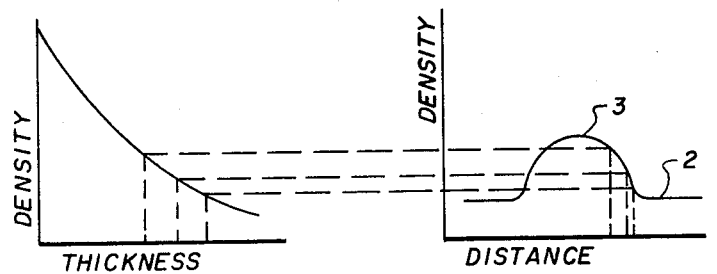
FIG. 3A
FIG. 3B
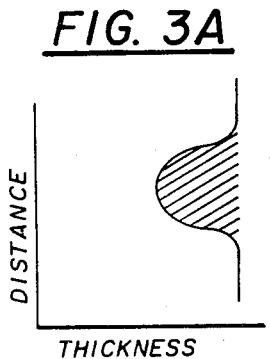
FIG. 4A
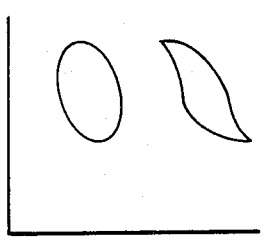
FIG. 4B
INVENTOR.
FREDERICK HARTMANN
BY
*Richard D. Seibel*
ATTORNEY

INVENTOR.
FREDERICK HARTMANN

INVENTOR.
FREDERICK HARTMANN
BY
Richard D. Seibel
ATTORNEY

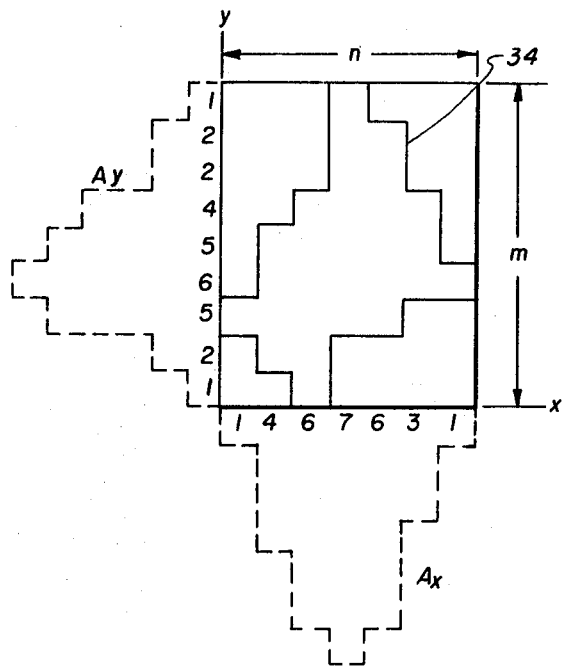
FIG. 11
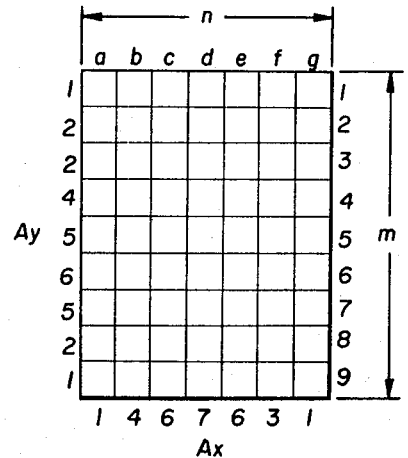
FIG. 12A
FIG. 12B
FIG. 12C
FIG. 12D
FIG. 12E
FIG. 12F
FIG. 12G
INVENTOR.
FREDERICK HARTMANN
BY Richard D. Seibel
ATTORNEY

FIG. 12H
FIG. 12I
FIG. 12J
FIG. 12K
FIG. 12L
FIG. 12M
FIG. 12N
FIG. 12O
FIG. 12P

INVENTOR.
FREDERICK HARTMANN
BY Richard D. Seibel
ATTORNEY

INVENTOR.
FREDERICK HARTMANN
BY Richard D. Seibel
ATTORNEY

INVENTOR.
FREDERICK HARTMANN

INVENTOR.
FREDERICK HARTMANN
BY
*Richard D. Seibel*
ATTORNEY

MEASURING METHOD AND APPARATUS

BACKGROUND

In many situations it is desirable to know the geometry of an object that is hidden from direct examination and measurement. Thus, for example, the geometry of a bone, organ, or tumor hidden beneath the flesh may be of interest and direct measurements are not available in the absence of surgery. Similarly, in the field of non-destructive testing it is often important to know the size, shape, and location of inclusions, voids, cracks and the like in a structure such as a casting, a weld bead, or other object. Further, it is often desirable to determine the density of a bone in the body or of an inclusion in the weldment or the like.

As is well known, the presence of such hidden objects can be found by examination with X-rays, gamma rays, ultrasonics, or the like. In such an examination the part is illuminated with X-rays, for example, and a photograph is taken on the far side of the part from the X-ray source. The photographic film exhibits a film density inversely related to absorption of the X-rays by the object. The photographic image of X-ray absorption give a measure only of the absorption caused by the object or, for a homogeneous body, the thickness of the body in a direction between the X-ray source and the photographic emulsion. The X-ray image may define a perimeter of a hidden object as viewed in a single direction but gives no indication of the shape of the surface of the hidden object since the film density indicates only the distance between two surfaces, each of which is independently variable. Furthermore, inspection of the single X-ray film tells nothing about the location of the body beneath the surface. Occasionally two X-ray images are obtained at different angles to locate, by triangulation, the depth of some portion of an object beneath a surface. Virtually nothing, however, is known about the three-dimensional shape of the hidden object.

SUMMARY OF THE INVENTION

Thus in the practice of this invention, according to a preferred embodiment, methods and apparatus are provided for passing energy through an object in two mutually angulated directions, measuring changes in energy passed in these two directions and correlating the energy changes with thickness of the object to provide data for thicknesses in the two directions. Additionally, the thickness values so determined are employed for reconstructing the location, shape, and radiographic density, of the object. A superposition algorithm is provided for finding shape.

DRAWINGS

Many of the attendant advantages of this invention will be readily appreciated as the same becomes better understood by reference to the following detailed description when considered in connection with the accompanying drawings wherein:

FIGS. 1A–1C illustrate an X-ray illumination arrangement for an object along with an illustration of the photographic image obtained;

FIG. 2 illustrates schematically a densitometer for measuring film density;

Figure 5:
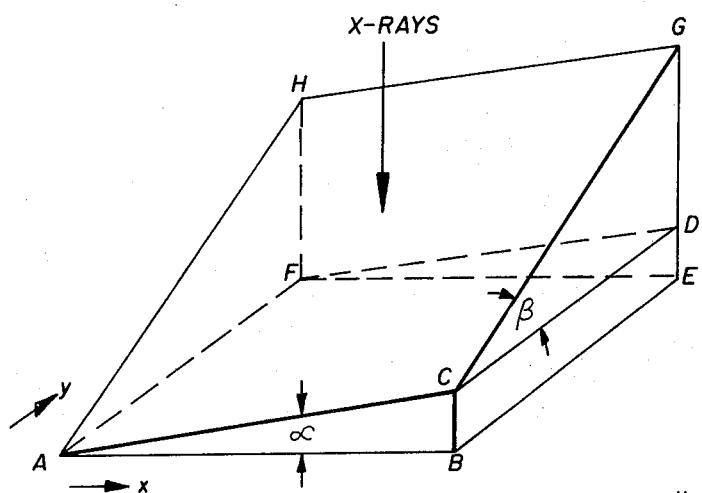
Figure 6:
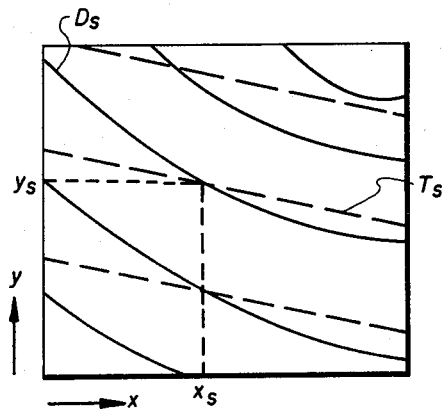
Figure 7:
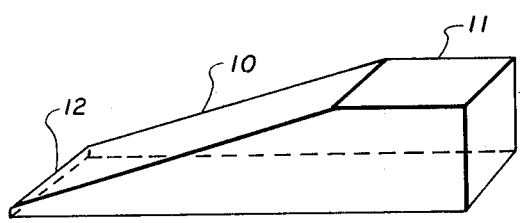
Figure 8:
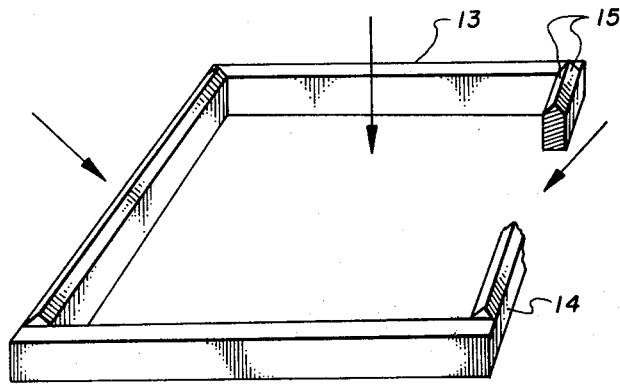
Figure 9:
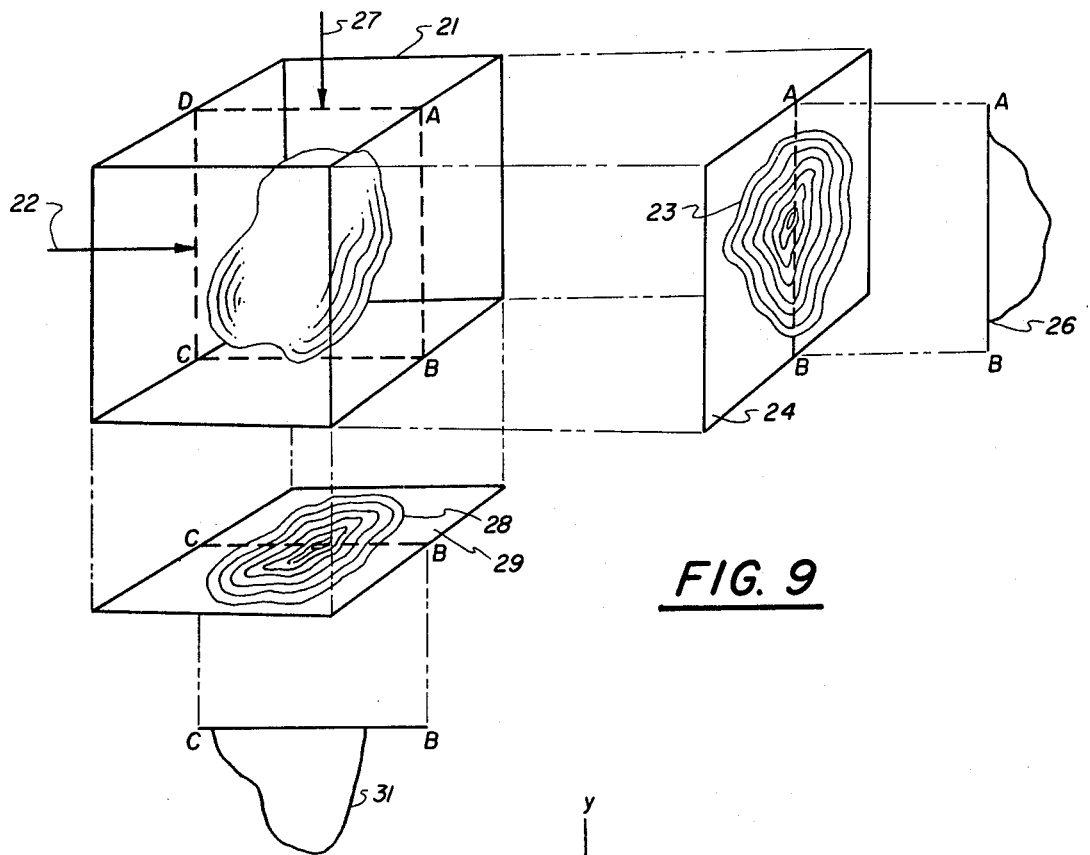
Figure 10:
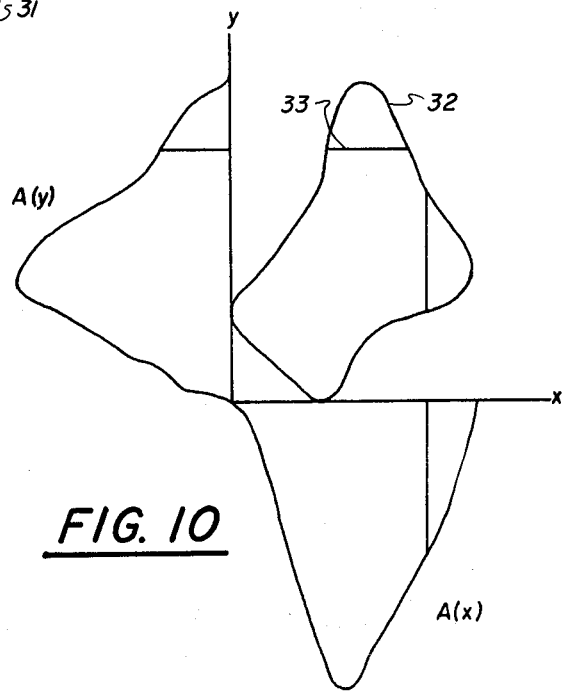
Figure 15:
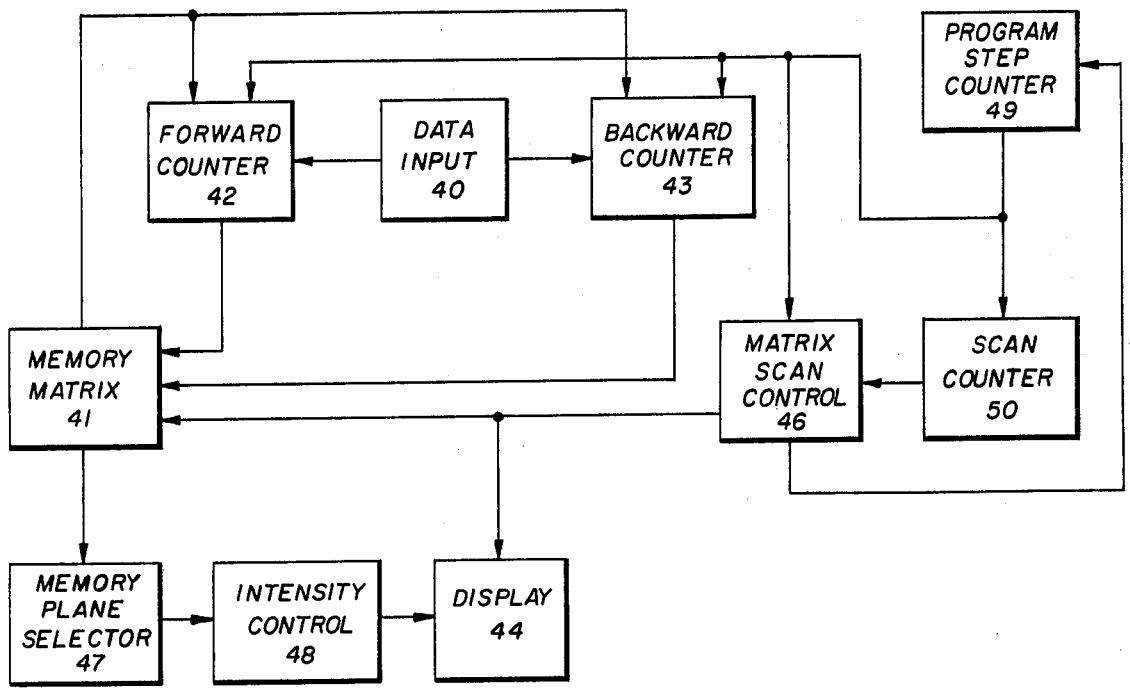
Figure 16A:
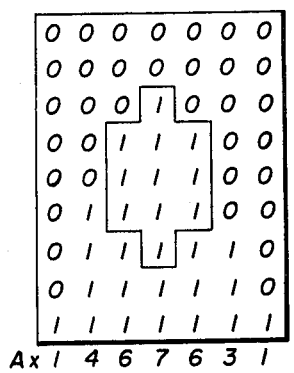
Figure 16B:
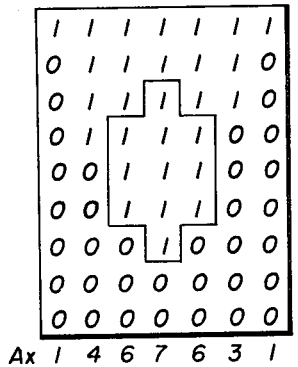
Figure 16C:
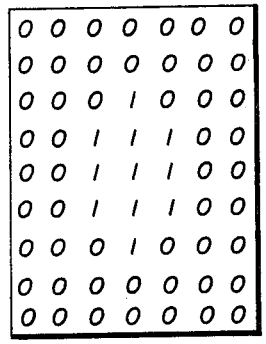
Figure 19:
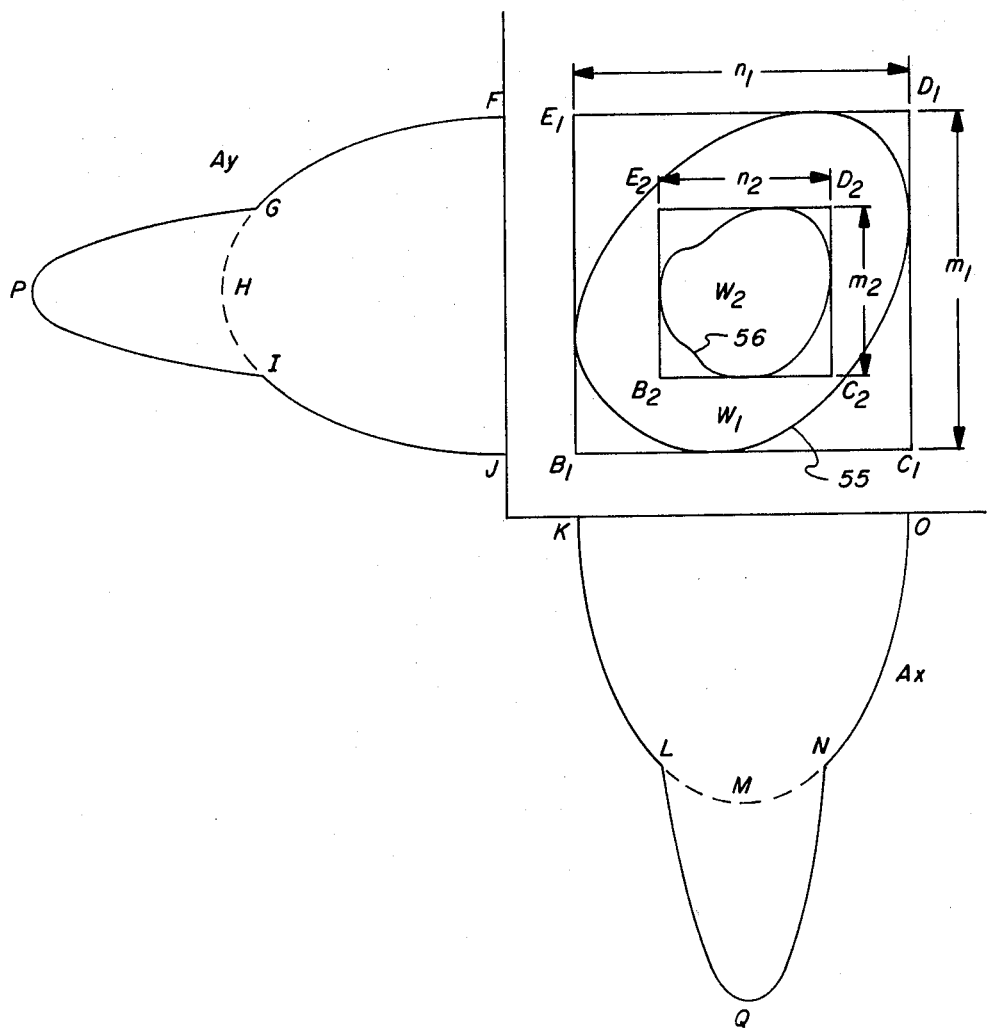

FIG. 3A and 3B comprise graphical representations of density measurements and utilization thereof;

FIG. 4A and 4B comprise graphical representations of thickness and distance information;

FIG. 5 illustrates a double wedge useful in practice of this invention;

FIG. 6 comprises a graphical representation of thickness and density relations of the double wedge of FIG. 5;

FIG. 7 illustrates a special density wedge useful for oblique views;

FIG. 8 illustrates in perspective a location frame useful in X-ray photography;

FIG. 9 illustrates a typical hidden object and thickness measurements made thereof;

FIG. 10 illustrates a typical shape reconstruction situation reduced to a single plane, i.e. a cross-section of a hidden object;

FIG. 11 illustrates the same cross-section as FIG. 10 except in quantized or digitized form;

Figures 12H, 12I, 12J, 12K, 12L, 12M, 12N, 12O, 12P:
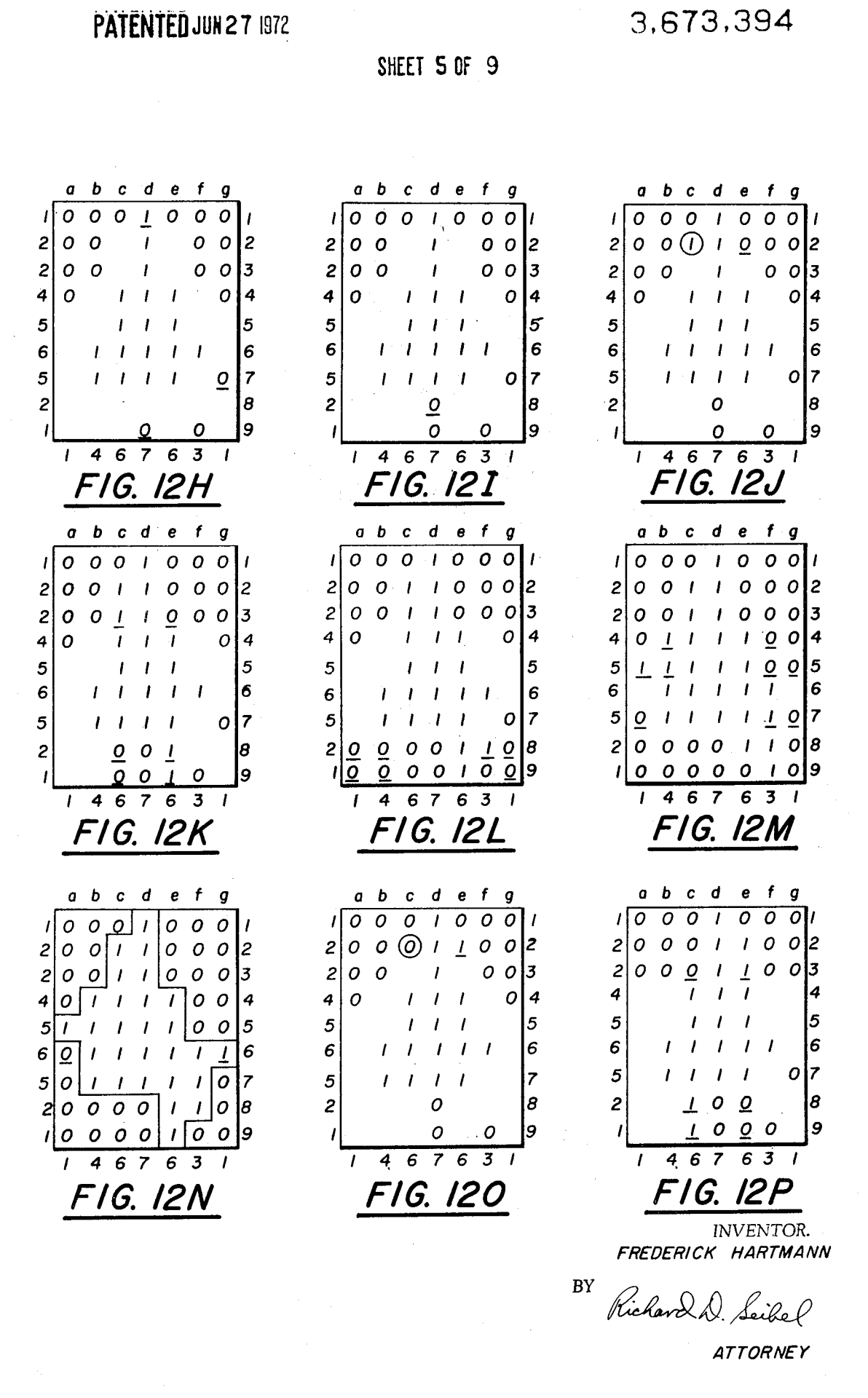
Figures 12Q, 12R, 12S, 13, 14A, 14B, 14C, 14D, 14E, 14F, 14G, 14H, 14I:
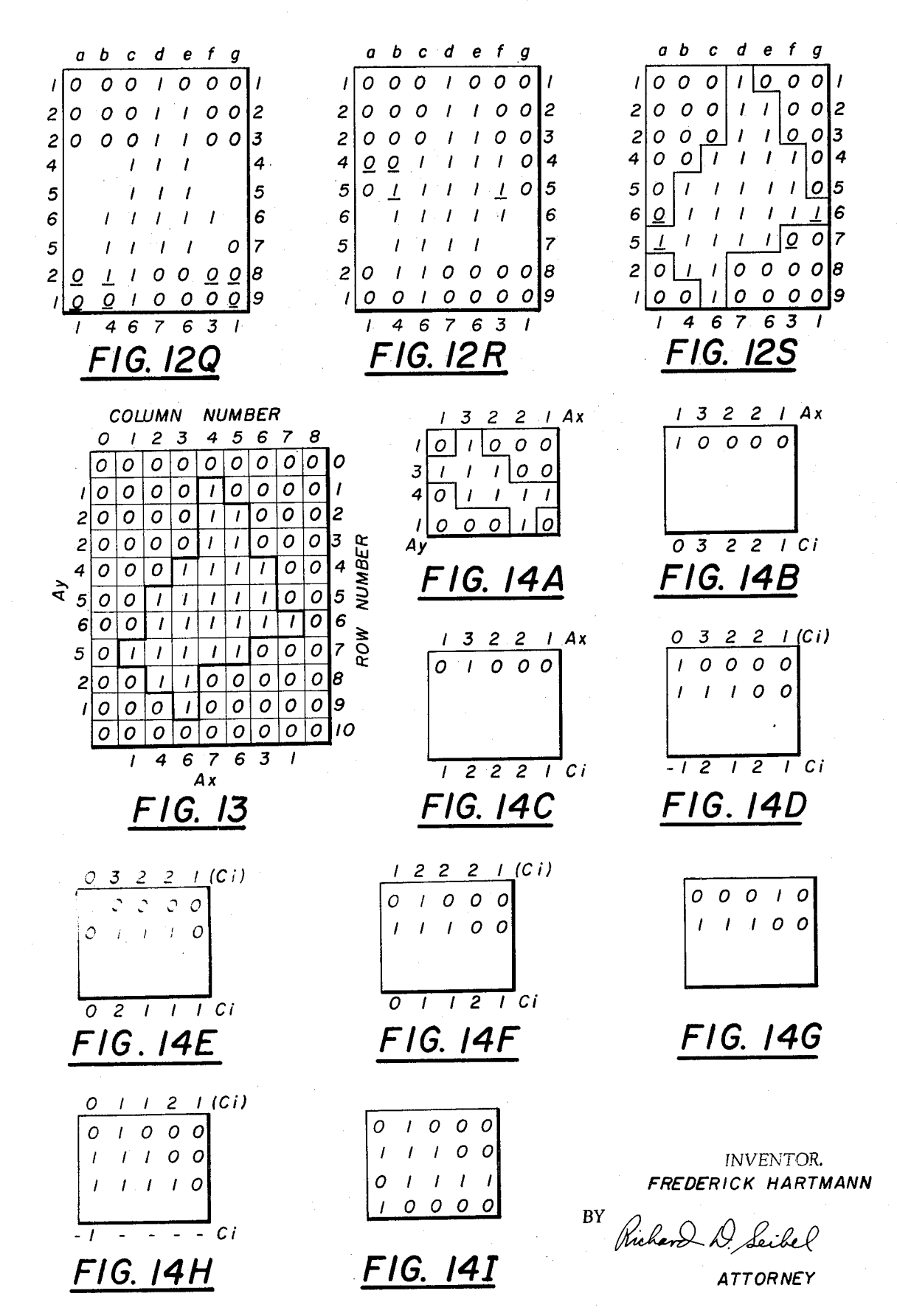

FIG. 12A to FIG. 12S illustrates a step-by-step reconstruction of the typical cross-section of FIG. 11;

FIG. 13 illustrates the cross-section of FIG. 11 in a form employed in a typical computer solution for the shape;

FIGS. 14A to 14I illustrate determination of a sample cross-section by an alternative technique;

FIG. 15 illustrates in block diagram form a special purpose digital computer for finding a cross-section;

FIGS. 16A to 16C illustrate memory core contents during data processing in the special purpose computer;

FIGS. 17A and 17B illustrate additional memory core contents during operation P3 of the special purpose computers;

FIGS. 18A to 18D illustrate additional memory core contents during operations P7 through P11 of the special purpose computer, and FIG. 19 illustrates a typical problem of multiple region reconstruction. Throughout the drawings like reference numerals refer to like parts.

DESCRIPTION

The description hereinafter is divided into several related parts as follows: BREADTH DETERMINATION (FIGS. 1 to 8) deals with measurement of thickness of an object by X-rays or the like; SHAPE RECONSTRUCTION (FIGS. 9 to 11) relates to the general problem of determining the shape of the object, the breadth of which has been found; ALGORITHM AND SAMPLE PROBLEM (FIGS. 12A to 12S) describe a superposition technique for reconstructing the shape of the object; GENERAL PURPOSE COMPUTER SOLUTION (FIG. 13) describes one typical computerized reconstruction of the shape of the object; SPECIAL PURPOSE COMPUTER (FIGS. 15 to 18) describes a computer built to reconstruct the shape of the object according to the originally described algorithm; ALTERNATIVE SHAPE DETERMINATION (FIGS. 14A to 14H) deals with a trial solution technique for shape reconstruction; and MULTIPLE REGION RECONSTRUCTION deals with shape determination of one closed curve within another closed curve.

BREADTH DETERMINATION

FIG. 1A illustrates an X-ray illumination arrangement employed in the practice of this invention. As illustrated in this embodiment an X-ray source 1 illuminates a block of material 2 in which an object 3 is hidden, this object being, for example, a void in an otherwise solid block of metal. At the same time the X-ray source 1 illuminates a wedge 4 having a maximum height greater than the maximum thickness of the block 2. X-ray radiation passing around or through the block or wedge strikes a photographic film 5 which is thereby exposed. It will be readily recognized that FIG. 1A is a simplified representation for purposes of exposition and that many conventional aspects of X-ray exposure such as X-ray source controls, film casettes, fluorescent screens, and the like, are omitted for simplicity.

In the embodiment of FIG. 1A the X-ray source 1 is preferably remote from the pieces being X-rayed and the film 5 is in a casette directly beneath the pieces. With this arrangement the X-rays are substantially parallel at the film plane and a sharp image of the pieces being X-rayed is obtained. FIG. 1B illustrates a typical developed film 5 exposed with the arrangement of FIG. 1A. By using an X-ray tube located at a substantial distance from the parts and having a small focal spot plus a film with a fine grained emulsion and a steep characteristic curve (that is, the film blackening versus logarithm of relative exposure) one obtains an image of good definition and sharp contrast. In general, the background of the film, that is, the portion exposed directly to the X-ray source with no intervening block or wedge is the darkest or most dense portion. The darkness or optical density of the film is readily determined by a conventional densitometer such as is illustrated schematically in FIG. 2. In a typical densitometer a light source 6 is focused on the film 5 so that light is transmitted therethrough in a relatively small area. Commercially available microdensitometers provide the ability to measure the optical density in an area only a few thousandths of an inch across. The transmitted light is collected and monitored by a photosensor 7 such as a photomultiplier tube, or the like. The electrical output of the photomultiplier tube is recorded in a recorder 8 as a direct indication of the degree of light transmission through the film 5. A region on the film having the greatest darkening has the least light transmission and is considered to have the highest optical density. If desired, the electrical output of the photosensors 7 while being recorded may also be digitized by an analog-to-digital converter 9. Such digital information is useful as will become apparent hereinafter.

Referring again to FIG. 1B a densitometer scan is made on the film 5 along the line C—C through the image of the void. An analog representation of the film density as a function of the distance along the film is shown in FIG. 1C. As mentioned hereinabove, the greatest film density is in the background portion of the film, for example, beyond the left hand side of the image 2' of the block 2. In the densitometer scan, proceeding from left to right, the density drops to a uniform level 2'' across the image of the block 2'. A somewhat greater density 3'' is noted in the image 3' of the void 3 since less material intercepts the X-ray beam in this region. As becomes clear hereinafter, a function of this increased density 3'', found in a scan along an image of the void, is employed in finding the shape of the hidden void or other object. Proceeding further to the right the film density again jumps to the background value between the images of the block 3' and the wedge 4'.

The block and the wedge in the X-ray beam reduce the intensity of the X-rays largely through absorption. Under ideal conditions and for monochromatic X-rays, the reduction in beam intensity is readily calculated. However, ordinary X-ray equipment emits a whole spectrum of wavelengths which with secondary effects, (geometry, scattering, fluorescent radiation and the like) prevent the direct determination of the thickness of material solely on theoretical grounds. Apart from the properties of the X-ray beam and the pieces being X-rayed, the density of the developed film depends on many other factors such as film sensitivity, development conditions and actual X-ray intensity in a given exposure. It is therefore desirable to incorporate in each exposure an internal standard which is X-rayed simultaneously with every sample.

Such an internal standard is provided by the wedge 4 which has a gradually changing and known thickness. In the exposed film 5 the calibration wedge 4 produces a gradual density reduction in the wedge image 4' and because of X-ray absorption characteristics and film response characteristics the optical density of this graded region 4'' is usually nonlinear as illustrated in FIG. 1C.

In order to find the thickness corresponding to the density difference due to the void, it is convenient to employ a graphical technique as illustrated in FIG. 3A and 3B. It will be apparent that an analytic technique can be employed if desired. In FIG. 3A the film density is plotted as a function of the thickness of the wedge to yield a nonlinear curve wherein the measured film density decreases as the known wedge thickness increases. In FIG. 3B the film optical density in the region of the void image 3' is plotted as a function of distance along the densitometer scan so that FIG. 3B is, in effect, an enlarged portion of FIG. 1C showing the density 3'' of the image of the void. Each value of density of the image is converted to a thickness of material by means of the calibration curve of FIG. 3A, each density corresponding uniquely to a given material thickness as found by following the dashed lines from FIG. 3B to FIG. 3A. Thus, by noting these measured thicknesses as a function of distance, a curve such as plotted in FIG. 4A is obtained showing the full thickness of the block with an apparent reduction in thickness at the location of the void. It is, of course, the decreased thickness as represented by the shaded area in FIG. 4A that is of interest in determining the shape of the hidden void.

It will be apparent that the shape of the hidden void cannot be determined solely by examination of thickness versus distance information as illustrated in FIG. 4A. This becomes clear when one considers that either of the two regions sketched in FIG. 4B has a thickness or breadth that will project as the same thickness area of FIG. 4A. It is also apparent that, as a void in a metal object for example, a void with the shape on the left in FIG. 4B may be relatively harmless whereas a void with the shape shown on the right in FIG. 4B could be quite detrimental because of the sharp corners which act as stress raising points. It is therefore highly desirable to provide additional information concerning the shape of the hidden object.

Before proceeding with a further description of a determination of the shape as obtained by multiple views of an object, a somewhat more advanced calibration technique will be described for the situation where the hidden object also has appreciable X-ray absorption. Thus, for example, if the hidden object 2 in the block 3 comprises an inclusion of oxide or other material whose composition and hence X-ray attenuation differs from that of the block, a more complex calibration is required. In this technique two standard wedges are employed as illustrated in FIG. 5. One of the wedges ABCDEF is formed of the same material as is found in the inclusion. The wedge angle $\alpha$ is selected to provide a maximum wedge thickness greater than any anticipated thickness of inclusion material. The second wedge ACDGHF is formed of the same material as the block and has a wedge angle $\beta$ sufficient to provide a maximum wedge height greater than the maximum thickness of sample to be X-rayed. The two wedges are placed one on top of the other in such a manner that the thickness of one material (the inclusion, for example) changes only in a first direction $x$ and the thickness of the other wedge changes only in the orthogonal direction $y$.

As hereinabove described the calibration wedge so prepared and a block with an inclusion or other sample are X-rayed simultaneously with the X-rays impinging on the wedges in the direction illustrated by the arrow in FIG. 5. The film density resulting from such X-raying of the double wedge is highest in the corner A, where less material is traversed, and lowest at the corner E, where the maximum quantity of material is traversed by the X-ray beam. A plurality of densitometer scans are made of the image of the wedge, however, a single calibration curve such as was illustrated in FIG. 3A is not obtained. Instead, an isodensity chart is obtained as illustrated in FIG. 6. Each of the curved lines on the chart of FIG. 6 is a line of constant density analogous to contour lines on a map showing lines of constant altitude.

On the isodensity chart of FIG. 6 there are also plotted lines of equal total wedge thickness ($T =$ constant). These total thickness lines, shown as dashes for clarity, are parallel straight lines given by the equation $T = x \tan\alpha + y \tan\beta$.

In order to use the isodensity chart of FIG. 6 the total sample thickness $T_s$ at the point of interest is measured. For a uniform block as shown in FIG. 1A $T_s$ will be constant over the entire object. (If, however, the object being X-rayed is of non-uniform thickness the thickness over the inclusion must be measured at each point where the thickness of the inclusion is desired). At a given point on the photographic film the measured density of the image of the inclusion plus block may be found to be $D_n$, for example. The intersection of the thickness line $T_s$ and the isodensity line $D_s$ defines coordinates $x_s$ and $y_s$ on the double wedge. Since in the double wedge the thickness of the material like that of the inclusion increases only in the $x$ direction, the thickness of the inclusion is simply $x_s \tan \alpha$. Similarly, the thickness of the material of the parent body surrounding the inclusion at that point is merely $y_s \tan \beta$. Thus the thickness of the inclusion is readily determined by the double wedge just as the thickness of the void was obtained by the single wedge as hereinabove described.

It will be apparent that the sensitivity of the technique for an inclusion in a body of a different material is greater the more the two substances differ in their absorption coefficient. Small differences in absorption coefficient may leave appreciable uncertainty in the shape for the same reason that such inclusions leave but shadowy images upon X-ray examination. If the X-ray absorption coefficient has a small difference, other techniques such as, for example, acoustic attenuation, neutron absorption or the like may be employed to obtain better definition than is possible with X-ray examination.

Surprisingly it is found that if the difference in absorption coefficient is large it is possible to obtain the shape of the hidden object even when the external dimensions of the parent material are unknown. Such is the case for example, in determining the shape of the marrow cavity in a bone when the bone is hidden beneath flesh. In such a situation the external geometry of the bone cannot be directly measured, however, it has been found that the shape of the flesh, the bone, and the marrow cavity in the bone can all be found by application of the principles of this invention.

Returning to the case of a single discontinuity such as a single hidden object, a slightly different type of wedge may be employed for calibration when X-ray images are taken at angles of incidence different from the normal incidence hereinabove described and illustrated. Thus, for example, in some situations it is desirable to place an X-ray source so that the beam passes through the object to be examined at 45° from normal incidence on one or both sides of normal incidence. If one used a simple triangular wedge at a 45° angle or the like, the full height of the wedge would not be traversed by the X-ray beam and no full calibration curve would be obtained. In order to avoid this difficulty a wedge as illustrated in FIG. 7 is preferably employed comprising a sloping ramp 10 and a constant thickness portion 11 which extends for at least the same distance as the height of the wedge. It is also desirable to delete the sharp edge of the wedge as shown at end 12. The feather edge of the wedge is not needed for calibration in most instances and removal not only prevents damage to the thin portion of the wedge but also provides a sharp indication of the beginning of the wedge which may be useful for providing a fixed point on the calibration curve and also a fixed point on the film to be employed with the other end of the wedge for film shrinkage determination.

Another accessory often useful in practice of this invention is a locating frame as illustrated in FIG. 8. The frame 13 is preferably of a size to fit within the edges of the X-ray film and has sufficient thickness to provide a readily distinguished image due to its X-ray absorption. Such a frame can readily be fabricated of brass rods or may conveniently be made by casting type metal in a mold so that damaged frames can be salvaged and re-melted. The frame 13 is employed in X-raying parts not having edges or the like within the area photographed for providing a precise location identifier on the film. By carefully placing the frame 13 on the part to be X-rayed the location of any hidden object such as a void within the part is readily determined. The frame is also useful in providing two of fixed location points on the film so that a constant factor can be employed to the densitometer scan to account for densitometer magnification, film shrinkage, or the like.

The frame 13 is preferably made with at least two of the sides having a cross-section as illustrated in the cutaway portion of one side. The cross-section of these two sides has at least one vertical side 14 to provide a sharp image on the film in photographs taken at normal incidence. In addition the sides of the frame also have two sloping portions 15 which, in a preferred embodiment, slope at 45° from the vertical side 14. With this arrangement when a photograph is taken at an angle of incidence of 45° from the normal, a relatively great thickness of the frame is traversed by the X-ray beam all the way to the edge and a sharp image is obtained on the film. As is pointed out herein, it is often convenient to take three photographs of a region in which hidden objects may occur, one at normal incidence and one at 45° to each side of normal incidence. Therefore, two sloping sides 15 are provided on at least two sides of the frame 13 so that sharp images of the frame are obtained on the respective photographs without having to move the frame relative to the part being photographed. In this manner a consistant reference position is obtained.

The principles of this invention have been described to this point by reference to X-ray examination of a hidden object. It will be apparent to one skilled in the art that the same principles are applicable to other forms of energy such as for example, optical beams, ultraviolet, infrared, gamma rays, neutrons, ultrasonic waves, or similar beams of energy passed through the part. It will also be apparent that an enlarged image can be obtained, as, for example, in transmission electron micrography of non-crystalline materials, wherein by tilting the sample in an electron beam, shape of cells and other biological structures may be found. Similarly light attenuation in stained biological specimens or mineralogical specimens can be employed to find the cross-section of microscopic objects such as a cell nucleus. Neutron radiography is useful in some instances where the attenuation is due to capture cross-section of the materials rather than merely attenuation by absorption as with X-rays. Thus, for example, the shape of an explosive in a metal container can be found due to the differences in neutron capture cross-section in situations where X-rays are substantially useless. Ultrasonic beams are useful when a substantial sonic impedance attenuation accompanies the hidden object.

A variation in finding thickness is the direct sensing of energy along a line rather than first recording intensity on a film and subsequently measuring photographic density. This technique is particularly useful with neutron or gamma ray beams wherein neutron detectors, scintillation counters or the like are scanned across the part to directly measure beam intensity and hence attenuation. X-ray beams can be measured directly with suitable vidicon type tubes. It is apparent that this technique is good for a cross-section in one plane, and separate scans are needed for each plane. In cases where the full three dimensional shape is desired, photographic techniques are usually preferable so that multiple parallel planes are recorded in a single exposure. Direct sensing can be employed with a matrix of detectors if desired. With such direct sensing it is apparent that electronic recording of sensed intensities is readily provided.

SHAPE RECONSTRUCTION

Returning now to the reconstruction of the shape of the hidden object there is illustrated schematically in FIG. 9 a somewhat more complex hidden object for further illustrating a multiple image technique for obtaining sufficient information to reconstruct the shape of the hidden object. As illustrated in this Figure a body 20 is hidden within a opaque surrounding material 21 which, for purposes of illustration, is shown as if transparent. The hidden body 20 has an irregular and unknown shape and the body 21 containing the hidden object is preferably of a regular shape or the shape must at least be known or determinable. In order to gain information concerning the hidden object 20 the article is illuminated with an X-ray beam 22 and an image 23 is obtained on a photographic film 24 with the image 23 having photographic density variations corresponding to absorption of the X-rays by the hidden body 20. For purposes of illustration, the image 23 is shown in the manner of a contour map with the contour lines following paths of equal photographic density. It will be apparent that the formation of an image depends on the body 20 having a different X-ray absorptivity from the surrounding material 21 as is the case in practical problems. The absorption of the hidden body may be higher, as in the case of bone in flesh, or it may be lower, as in the case of a void in a casting, and the principle is equally applicable. It should also be apparent that in lieu of an X-ray beam 22 that a beam of ultrasonic energy, nuclear radiation, or the like can be employed.

The image 23 can also be a positive or negative image but for convenience of discussion will be considered to have an increasing density from an edge toward the center, corresponding to an increasing thickness of a hidden body 20 from an edge toward the center. It will be apparent that such a convexity will be present in regular hidden bodies, and that near the edge the X-ray beam would pass through a relatively larger proportion of the surrounding material 21 and a relatively smaller portion of the hidden body 20 than near the center of the body where the X-ray beam would pass through a relatively smaller proportion of the hidden body 20.

It will be apparent that in order to reconstruct the entire shape of a hidden body it is only necessary to define the shape of a plurality of parallel cross-sections of that body and then reassemble these reconstructed cross-sections. For purposes of exposition herein the problem can then be considered as one of defining the shape of a closed curve in a single plane, always recalling that the shape of a three-dimensional body is defined by a plurality of such closed curves.

In order to obtain data for solution of a closed curve in a plane, e.g. for determination of the shape of the cross-section of body 20 in plane ABCD, measurement is made of the photographic density of the image 23 along a line AB across the image. Such a density scan of the image can readily be made with conventional densitometers or preferably, for most purposes, a microdensitometer which measures the photographic density in a very small area. A densitometer scan made across the image yields a curve 26 of density versus distance which is obviously a measure of the X-ray absorptivity or thickness of the hidden body 20 in a plane ABCD.

In a similar manner the hidden body is illuminated with an X-ray beam 27 in a direction angulated relative to the X-ray beam 22. For purposes of illustration and simplicity the X-ray beams 22 and 27 are orthogonal, however, as will appear hereinafter any angular relationship therebetween can be employed without deviating from the principles of this invention. The X-ray beam 27 forms an image 28 of the hidden body 20 on a photographic film 29 placed on the opposite side thereof. In FIG. 9 the image 28 is drawn in the form of a contour map of the thickness of the hidden body in a direction along the X-ray beam 27. In the same manner as hereinabove described a microdensitometer scan is made along a line BC across the image 28 thereby yielding a density versus distance curve 31 representative of the thickness of the body 20 in the plane ABCD as viewed in the direction of the X-ray beam 27. It is also apparent that the exact location of the hidden body 20 can be found from the images 23 and 28 if the opaque surrounding material 21 is equipped with a frame of reference, either by its own geometry or an external one such as the aforementioned brass frame of FIG. 8, and the X-ray shadows of the frame of reference related to the images 23 and 28.

The heights or thicknesses of the curves 26 and 31 need not be, and seldom are, equal since the hidden body is being viewed from two different directions. Even the area under the curve 26 will, in general, not equal the area under the curve 31 because of the non-linear correlation between radiographic density and thickness. After curves 26 and 31 have been transformed to thickness curves with the aid of a standard wedge by the technique hereinabove described, the two thickness curves will have equal areas since both represent the quantity of material in the body 20 located in the plane ABCD even though the heights may still differ.

A typical closed curve problem is illustrated in slightly different form in FIG. 10. In this figure a closed curve 32 of the form $F(x,y) = 0$, lies in an $x,y$ plane, and for purpose of convenience, orthogonal $x$ and $y$ axes are selected to lie tangent to the closed curve 32. The horizontal width of the region enclosed by the curve 32 is plotted along the $y$ axis as the smooth curve $A(y)$; that is, the length of a line 33 across the closed curve 32, is the same as the width of the curve $A(y)$ at the same $y$ coordinate. In a similar manner the vertical length or height of the region enclosed by the curve 32 is plotted along the $x$ axis as the smooth curve $A(x)$.

Thus by passing energy in the form of an X-ray beam through the body in two mutually angulated directions and measuring changes in the energy passed in the two directions along lines both lying in a plane common to the two directions, and transforming the energy changes (density differences) into thickness values, there are obtained two curves representing the thickness or breadth of a hidden object. A first curve $A(x)$ is a thickness scan of the object as viewed in the first direction in the plane and the second curve $A(y)$ is a thickness scan of the object in the second direction in the plane. Although $A(x)$ and $A(y)$ both represent thickness of the object they do not directly indicate the shape of the cross-section of the object in the plane.

The next problem to be solved in then: given only the curves $A(y)$ and $A(x)$ how can one reconstruct the original curve $F(x,y) = 0$? That is, given only two thickness profiles, how does one determine the cross-section of the object in a plane common to the two thickness profiles?

Two algorithms for this solution are described hereinafter, both in digital rather than analog form. The superposition of sets of contiguous positions in a matrix, repetitively conducted to define the areas within and without the curve, forms the foundation of the first algorithm. This can be worked out by hand, and both a general purpose and a special purpose computer technique are described. Another technique examines all feasible solutions in a systematic pattern and identifies the correct shape of the cross-section.

A constraint on solution of this problem in the simple case set forth initially for purposes of exposition is that the closed curve has no more than two intersection points with any straight line in either the $x$ or $y$ direction. That is, the curve is not reentrant or concave in either the $x$ or $y$ direction alone. This property of the curve, which will be called hereinafter $x,y$ - convexity, is less restrictive than general convexity. It will be apparent from an examination of the closed curve 32 that concavities do not occur in the curve in the upper left and lower right portions, respectively, however, there is no concavity in either the $x$ or $y$ direction. In many practical problems in which a concavity does occur in a closed curve, rotation of the $x$ and $y$ axes or examination of the curve in non-orthogonal directions will satisfy the aforementioned constraint. For this reason, in examining a hidden object it is usually desirable to obtain thickness data in at least three directions, for example, at normal incidence and at 45° to each side of the normal. In examining a bone or other object where the general shape is predictable, judicious choice of viewing directions may avoid any $x, y$ concavities.

The curve 32 in FIG. 10 and the curves $A(y)$ and $A(x)$ are continuous or analog curves and, although the techniques hereinafter described can be employed to solve the continuous case, a preferred technique is to express and solve the problem of reconstructing a curve in a digital form. For this reason a rectangular grid of any desired degree of fineness may be superimposed on the curve of FIG. 10 and the curve quantized according to the number of unit squares therein. Thus the region inside the curve 32 of FIG. 10 is changed as illustrated in FIG. 11 to a similar region 34 comprising unit squares, with gross boundaries of the step function curve 34 approximating the shape of the curve 32. It will be apparent that a finer grid than illustrated in FIG. 11 will more closely approximate an analog curve, however, for purposes of exposition, an approximation as presented in FIG. 11 is adequate. In a similar manner the analog curves $A(x)$ and $A(y)$ in FIG. 10 are converted to digital or quantized curves $A_x$ and $A_y$ as illustrated along the $x$ and $y$ axes respectively, in FIG. 11. The quantized curves $A_x$ and $A_y$ are also expressed as numerical values along the $x$ and $y$ axes, respectively, representing the total number of squares within the region 34 in the $x^{th}$ column and $y^{th}$ row, respectively.

Hereinafter, the squares inside of an enclosed curve will be designated as containing a 1 and squares outside of the curve will be designated as containing a 0. This is not only a convenient means for distinguishing squares inside the curve from those outside and thereby defining the shape, but is a convenient nomenclature for the binary digital computer solutions hereinafter described.

ALGORITHM AND SAMPLE SOLUTION

A very efficient algorithm has been developed for determination of the shape of the closed curve or cross-section when only the thickness curves, $A_x$ and $A_y$ are known. The algorithm is readily applied to a digital computer for rapid solutions of problems with a large number of units or quantized steps in the $A_x$ and $A_y$ input curves. This solution may be by means of a suitably programmed general purpose computer or by a special purpose computer as pointed out in greater detail hereinafter. The algorithm involves the identification of elements (or squares in the matrix of FIG. 11) for which either a 1 or a 0 is confirmed; that is, identification of those squares which must be either inside (1) or outside (0) of the closed curve. The algorithm is a superposition technique which comprises the application of several rules based mostly on the intersection properties of two sets. The first two rules of the algorithm are:

1. Insert proven 1's in those spaces where the set of 1's in the respective column or row adjacent one margin overlaps the same set of 1's adjacent the opposite margin (at the center of all columns and rows in which more than half the length is occupied).
2. Insert proven 0's at the ends of those columns and rows where proven 1's have been found before by Rule (1), and the set of 1's in the respective column or row cannot extend to the margin from the next remote proven 1.

These rules are explained, along with others hereinafter presented, by reference to a specific problem, namely, that of finding the shape of a closed curve such as illustrated in FIG. 11. The step by step solution of this problem is set forth in FIG. 12A to FIG. 12S. The basic problem to be solved is illustrated in FIG. 12A wherein the width of the curve in the $x$ direction is stated as a series of numerical values along the left margin of a rectangular 7 × 9 matrix of empty squares. The numerical values stated along the left side are those of the curve $A_y$ of FIG. 11. Similarly, along the bottom margin of FIG. 12A are numerical values representing the height of the closed curve of FIG. 11 in the $x$ direction, that is, the numerical values for the height of the curve $A_x$.

FIG. 12A also introduces some additional nomenclature of assistance in exposition of the above rules and others hereinafter set forth. The seven columns in the matrix of FIG. 12A are lettered $a$ through $g$ and the rows are numbered 1 through 9 along the right margin so that any square in the matrix can be readily identified. Thus, for example, the lower right hand square in the matrix is identified as $g9$. The total width of the matrix along an $x$ direction is identified as $n$ for exposition of some of the rules hereinafter stated and the height of the matrix in the $y$ direction is stated as $m$ for similar reasons. It will be apparent that in the matrix of FIG. 12A the width $n$ equals 7 units and the height $m$ equals 9 units. In application of the rules, the columns and rows are treated similarly and "line" may be used to refer to either a column or row as may be applicable.

In FIG. 12B Rule (1) is applied to the columns. Beginning at the left side of the matrix, column $c$ is the first column in which the number of occupied squares (six) is greater than one-half of the length of the column (nine). There is, therefore, a set of six 1's located somewhere within the nine spaces in column $c$.

Since one of the constraints on the problems stated hereinabove is that there is no concavity in either the $x$ or $y$ direction, it is apparent that the 1's in each row and column must all be adjacent to each other. If this contiguous set of 1's is placed at the upper end of column $c$ it will be seen that squares $c1$ through $c6$ are occupied by the set. Similarly, if the set of contiguous 1's is placed at the bottom of column $c$ the 1's will occupy the squares $c4$ through $c9$. This placement of the set in the uppermost and lowermost positions in the column shows an overlap or intersection of the two sets in spaces $c4$, $c5$ and $c6$. That is, when the contiguous set of six is in the uppermost position in column $c$, squares $c4$, $c5$, and $c6$ are occupied by 1's, and also, when the set is in the lowermost position the squares $c4$, $c5$ and $c6$ are occupied by 1's. Therefore, according to Rule (1) proven 1's are inserted in the centermost squares, $c4$, $c5$, and $c6$, since the overlapping sets prove that this portion of the column must be within the closed curve. A moment's consideration will also confirm that any intermediate location (that is, away from the margins) of a contiguous set of six 1's in column $c$ will have 1's in the spaces $c4$, $c5$ and $c6$.

Although, as pointed out hereinafter, the sets of 1's may be actually arrayed at opposite sides of the matrix in a special purpose digital computer, such actual placement is not necessary and the thickness profiles for the cross-section need only be supposed or assumed to be at the margins for purposes of finding an area of superposition or overlap. In one general purpose computer solution described hereinafter the profiles are supposed along the edges of the matrix and the boundary of the thickness profile is employed rather than an actual area array for finding the region of superposition which is necessarily within the closed curve representing the cross-section.

Rule (1) is also applied to column $d$ of FIG. 12B wherein a set of seven contiguous 1's is present and, by the same rationale, the two extreme sets overlap in spaces $d3$, $d4$, $d5$, $d6$ and $d7$ and proven 1's are entered in those squares. In a similar manner column $e$, which contains a set of six contiguous 1's, has proven 1's entered in spaces $e4$, $e5$, and $e6$.

Rule (1) is then applied to the rows of the matrix in a similar manner as illustrated in FIG. 12C. Row 4 of the matrix is the first in which the set of occupied spaces exceeds half the length of the row, however, the center squares of row 4 are already occupied and no additional unoccupied squares are within overlapping sets of 4. Row 5 of FIG. 12C is similar to row 4. Row 6 has a contiguous set of six 1's within the seven squares of row 6 and the overlapping extreme left hand and extreme right hand sets establish that proven 1's can be entered in spaces $b6$, and $f6$, as well as in spaces $c6$, $d6$ and $e6$ which were previously occupied by proven 1's. The new 1's added by application of Rule (1) to row 6 are underlined in the drawing for purposes of exposition; and all new 1's or 0's added in subsequent operations in FIG. 12 are designated by underlining while previously existing 1's or 0's in the matrix have no underlining. Row 7 of FIG. 12C has a contiguous set of five 1's and this set when shifted to the extreme left and right positions, respectively, overlaps in spaces $c7$, $d7$, and $e7$. New proven 1's are therefore entered in previously unoccupied squares $c7$ and $e7$ as indicated by underlining.

Rule (1) can also be stated algebraically that square or element $A_{xy} = 1$, (or is occupied by a 1) if $(m - A_x + 1) \leq y \leq A_x$ for the $x$th column and similarly, $A_{xy} = 1$ if $(n - A_y + 1) \leq x \leq A_y$ for the $y$th row. Applying the algebraic expression to column $c$ of FIG. 12B wherein $m = 9$, and $A_x = 6$ the expression then becomes $(9 - 6 + 1) \leq y \leq 6$ or $4 \leq y \leq 6$, and proven 1's can be entered in spaces $c4$, $c5$, and $c6$. Application of Rule (1) to rows is, of course, similar.

Rule (2) can be stated in algebraic terms also. In a column the highest and lowest $y$ values of squares occupied by 1's after application of Rule (1) are designated as $y_{max}$ and $y_{min}$, respectively (and similarly $x_{max}$ and $x_{min}$ for a row). The condition where $A_{xy} = 0$ in the $x$th column is stated by either $1 \leq y \leq (y_{max} - A_x)$; or $(Y_{min} + A_x) \leq y \leq n$, similarly, the square $A_{xy}$ is occupied by a 0 in the $y$th row when $1 \leq x \leq (x_{max} - A_y)$; or $(x_{min} + A_y) \leq x \leq m$.

The algebraic expression of Rule (2) is applied to FIG. 12C beginning with row 3 which is the first row in which proven 1's are present. The equation $1 \leq x \leq (x_{max} - A_y)$ reduces to $1 \leq x \leq (4 - 2)$. Since this is true for $x = 1$ and $x = 2$, proven zeros are entered in squares $a3$ and $b3$, that is, the first and second squares in row 3. The equation $(x_{min} + A_y) \leq x \leq m$ reduces to $(4 + 2) \leq x \leq 7$ which is true for $x = 6$ and $x = 7$ and therefore proven 0's are entered in spaces $f3$ and $g3$, that is, the sixth and seventh spaces on row 3.

This result can be visualized in a different manner when it is recalled that a constraint on the shape of the closed curve is that the 1's in a set are contiguous. In row 3 a 1 is already proven in space $d3$ and therefore all possible sets of two occupied spaces in row 3 must overlap on square $d3$. The balance of the set of two 1's must therefore be in either square $c3$ or $e3$ and therefore cannot lie in any of squares $a3$, $b3$, $f3$ or $g3$ in which proven 0's can therefore be inserted.

Similar application of Rule (2) to row 4 of FIG. 12C causes insertion of proven 0's in spaces $a4$ and $g4$.

When the rule is applied to row 5 the equation $1 \le x \le (x_{max} = A_y)$ reduces to $1 \le x \le (5-5)$ and $(x_{min} + A_y) \le x \le m$ reduces to $(3+5) \le x \le 7$, neither of which is true for any value of $x$ and therefore no proven 0's can be inserted in Row 6 merely by application of this rule.

Application of Rule (2) to the columns of the matrix is illustrated in FIG. 12D with the principle of the application being substantially the same as for the rows. Upon application of this rule proven 0's are entered in squares $b1$, $b2$, $c1$, $e1$, $f1$, $f2$, and $f9$ as indicated by underlining.

The first rule is used initially to find proven 1's, and since it works on the full matrix size, it is not employed again. The second rule and seven additional rules complete the first part of the algorithm for entering proven 1's or proven 0's in the columns or rows of a matrix and these eight rules are repetitively applied to the problem to reach a solution. The next three additional rules are as follows:

3. Insert proven 1's in any unoccupied spaces occurring in the same line (row or column) between two spaces occupied by proven 1's.
4. Insert proven 0's into all unoccupied spaces that occur between the margin of the matrix and a space occupied by a proven 0, or between two proven 0's in the same line if the number of unoccupied spaces is insufficient to accomodate the required number of 1's occurring in that line (that is, the value of $Ax$ or $Ay$).
5. Insert proven 1's in all lines in which more than half of the "usable" length of the line must be occupied in the same general manner as in Rule (1).

The "usable" length of a line, $m'$ or $n'$, means the original length of the line $m$ or $n$ minus the total number of squares on the two ends of the line already occupied by 0's. Thus, for example, the usable length of row 3 in FIG. 12C is equal to the original length $n$, or seven units, less four, which is the sum of the proven 0's already present in the two ends of row 3. The algebraic expressions set forth hereinabove for application of Rule (1) are applicable if $m$ and $n$ in these equations are replaced by $m'$ and $n'$, respectively.

Application of Rule (4) to the rows of the matrix is illustrated in FIG. 12E. In row 2 of FIG. 12E a single space exists at $a2$ between a proven 0 and the margin, and the value of $A_y$ for row 2 is two units, that is, a set of two contiguous 1's must exist in row 2. This contiguous set cannot exist in the single space $a2$, and therefore, a 0 is inserted therein. Similarly, a 0 is inserted in space $g2$ of FIG. 12E. The rule cannot be applied in row 1 of FIG. 12E since row 1 has but a single 1, or occupied space and spaces $a1$ and $g1$ are, therefore, not excluded merely by application of Rule 4.

The application of Rule (5) to the matrix is illustrated in FIG. 12F. Row 2 of FIG. 12F has a usable length of three units, that is, spaces $c2$, $d2$, and $e2$ which are not already occupied by proven 0's. Row 2 requires a contiguous set $(a_y)$ of two units or two 1's, thus, by application of Rule (5) employing the formulas of Rule (1) with the usable length $n'$ substituted therein, it is found that square $d2$ is overlapped by the two extreme sets and a proven 1 is therefore inserted in square $d2$.

A corner rule can be stated which prevents decomposition of the enclosed areas within the curve into two separate curves. This is a consequence of the constraint that there be no $x$- or $y$-concavity in the closed curve. A corollary of the constraint is that there is only a single closed curve within the matrix of interest. The corner rule can be stated as follows:

6. Insert 0's in all corner squares if the corner is surrounded by 0's in both directions.

The application of this rule to the exemplary matrix is illustrated in FIG. 12G wherein the corner squares $a1$ and $g1$ are followed by 0's in both column and row and therefore a proven 0 is inserted in each of these spaces despite the fact that sufficient room exists in the corner to accomodate the set of one which is present in row 1. It so happens that this rule, in practical situations is usually not needed since Rule (4) will effect substantially the same function, although possibly at a later iteration of the procedure. In some of the mechanized implementations hereinafter pointed out, this rule has not been explicitely included but is actually implemented in performing other rules.

Application of Rule (5) to columns is also illustrated in FIG. 12G and a proven 1 is entered in square $b7$ which square is within the overlapping portion of the extreme positions of a contiguous set of four 1's in the six square usable length of column $b$. The application to columns is the same as application to rows described hereinabove.

An additional application of Rule (2) to column $d$ is illustrated in FIG. 12G. It will be noted that an additional proven 1 was added to column $d$ as illustrated in FIG. 12F and therefore a repeated application of Rule (2) adds a proven 0 to square $d9$ since the equation $(Y_{min} + A_x) \le y \le n$; or $(2+7) \le y \le 9$, is true for $y = 9$.

Three line completion rules complete the first part of the algorithm for solution of the problem of finding a closed curve.

7. Complete a line with proven 0's if the number of proven 1's equals the total required $A_x$ or $A_y$ value.
8. Complete a line by inserting proven 1's into all unoccupied spaces if the number of proven 0's equals $m - A_x$ or $n - A_y$, respectively.
9. Complete a line by adding the remaining proven 1's (up to the total $A_x$ or $A_y$) and 0's if a proven 1 occurs at a margin of the matrix or adjacent to a proven 0.

Application of Rule (8) is illustrated in FIG. 12H. Row 1 has a single unoccupied space at square $d1$ and a single 1 ($A_y$) is present in row 1, therefore, a proven 1 is entered in space $d1$ thereby completing this row. Rule (2) is also applied to row 7 in FIG. 12H to insert a proven 0 in space $g7$.

Application of Rule (7) to the exemplary matrix is illustrated in FIG. 12I in column $d$ wherein seven proven 1's are already present and a proven 0 is therefore inserted in space $d8$ to complete this column.

Examination of FIG. 12I shows that none of the above mentioned nine rules of the algorithm will permit or cause the insertion of any additional proven 1's or proven 0's in the matrix and therefore a complete solution cannot be obtained with only these rules. The second part of the algorithm is therefore applied. This involves an arbitrary assignment of first a 1 and later a 0 (or vice versa) to an unoccupied square in the matrix. It is found that an arbitrary selection nearest a corner of the matrix yields a solution rapidly and in order to minimize the number of such arbitrary assignments in a practical situation, the assignments are always made nearest one corner of the matrix.

It has been found convenient to first make an arbitrary assignment of a 1 for the unoccupied space that is highest and nearest the left side of the matrix. For convenience, this is designated as the Northwest Corner Rule. As will be apparent hereinafter, it is also preferable to arbitrarily assign a value of 0 for the same blank space after a solution is obtained (if possible) for the assignment of a 1 to the unoccupied space. This is done so that if multiple solutions are possible, all will be identified.

Thus as illustrated in FIG. 12J, a value of 1 is arbitrarily assigned to square $c2$ which is the Northwest-most square in the matrix that is unoccupied. The solution then returns to a sequential application of Rules (2) through (9) to the matrix in substantially the same manner as hereinabove described, applying the rules to columns and rows alternately until either a solution is achieved or it is clear that no solution is possible without an additional application of the Northwest Corner Rule. Thus, by application of Rule (7) to the rows in FIG. 12J, a proven 0 is entered in space c2 since the value of $A_y$ is two and the arbitrary assignment of a 1 to space c2 completes the set of 1's in row 2. Referring to FIG. 12K, Rule (3) is applied and a proven 1 is inserted in square c3. Application of Rule (7) causes the insertion of proven 0's in spaces c8 and c9 thereby completing column c. Application of Rule (7) for rows causes insertion of a proven 0 in space e3, thereupon application of Rule (8) to columns causes insertion of proven 1's in spaces d8 and d9 thereby completing column d.

In FIG. 12L application of Rule (7) causes insertion of proven 0's in spaces a9, b9, and g9, thereby completing that row. Application of Rule (9) causes insertion of a proven 1 in space f8 and a proven 0 in space g8. Re-application of Rule (9) to FIG. 12L completes row 8 by insertion of proven 0's in spaces a8 and b8.

Referring to FIG. 12M application of Rule (3) to columns inserts a proven 1 in space f7 and application of Rule (7) completes column f by insertion of proven 0's in spaces f4 and f5. Column b is completed by insertion of proven 1's in spaces b4 and b 5 according to Rule (8). Application of Rule (9) to row 5 inserts a proven 1 in space a5 and a proven 0 in space g5 thereby completing that row. Application of Rule (7) to row 7 inserts proven 0's in spaces a7 and g7 thereby completing that row.

Application of Rule (7) in column a inserts a proven 0 in space a6 and application of Rule (8) completes column g as illustrated in FIG. 12N thereby yielding a solution to the problem and defining a region bounded by a closed curve as indicated by the bold outline in FIG. 12N.

It will be recalled that this solution was obtained by application of the Northwest Corner Rule wherein an arbitrary 1 was assigned to space c2 in order to obtain a solution after repeated application of the nine rules of the first part of the algorithm failed to establish any additional proven 1's or proven 0's. Therefore, in order to complete the solution and find all possible closed curves fitting the input data $A_x$ and $A_y$ an arbitrary 0 is inserted in space c2 and solution for the closed curve is conducted in substantially the same manner as hereinabove described. Thus, as illustrated in FIG. 12–O an arbitrary 0 is inserted in space c2 and row 2 is completed by insertion of a proven 1 in space e1 in accordance with Rule (8).

In FIG. 12P a proven 1 is inserted in space e3 in accord with Rule (3) and proven 0's are entered in spaces e8 and e9 in accordance with Rule (7) (or Rule (9)). Rule (7) is then applied to row 3 to insert a proven 0 at space c3 and column c is completed with proven 1's in c8 and c9 in accord with Rule (8).

Rule (7) completes row 9 as illustrated in FIG. 12Q and Rule (9) is employed to complete row 8 in the same manner as hereinabove described.

Column b is complete by application of Rule (9) as illustrated in FIG. 12R; and application of Rule (5) to column f causes insertion of a proven 1 in space f5 in a manner substantially the same as hereinabove described. Row 4 is then completed by insertion of a proven 0 in space a4 in accord with Rule (4) followed by insertion of a proven 1 in space f4 and a proven 0 in space g4 in accord with Rule (9). Similarly row 5 is completed in FIG. 12R by application of Rule (7).

The bounds of the closed curve are then defined by completing the matrix as illustrated in FIG. 12S. Application of Rule (8) inserts a proven 1 in space g6 and therefore a proven 0 is inserted in space a6 in accord with Rule (7). Rule (8) causes insertion of a proven 1 in space a7 and finally Rule (7) causes insertion of a 0 in space f7 to define the closed curve set forth in bold lines in FIG. 12S wherein all of the proven 1's are within the region bounded by the curve and proven 0's are all outside of the region bounded by the curve thereby defining a second solution. It will be noted that the closed curve of FIG. 12S found by use of a 0 in the Northwest Corner Rule is not a mirror solution of the closed curve of FIG. 12N found by application of a 1 in the Northwest Corner Rule. It will also be seen that the closed figure defined in FIG. 12S is identical to the closed curve from which the $A_x$ and $A_y$ curves were obtained, as illustrated in FIG. 11, thus showing that one of the two possible solutions of this particular problem is the correct solution. In this example, both additions made in accord with the Northwest Corner Rule yielded possible solutions. In some instances one of the additions of a 1 or a 0 yields a situation where no solution is possible, such as for example, presence of both a "proven" 1 and a "proven" 0 in the same space.

The question of multiple solutions of problems is seldom of much practical significance since other factors normally indicate which of two or more "correct" solutions truly is representative of the cross-section measured. Thus the ambiguity raised by multiple solutions is readily resolved, for example, by solving the problem with the aid of a third view of the same closed curve, from a third direction different from the original two directions. It may also occur that one of the "correct" solutions may be summarily rejected based on other empirical evidence or experiences.

Further, as a very practical matter, multiple solutions having significant differences therebetween, are relatively rare when the size of the matrix is increased significantly. In the example set forth hereinabove the matrix is only seven units by nine units, and two solutions are obtained having appreciably different shapes. In a physical problem in a matrix of 128 × 128 units, for example, it is found that radically ambiguous solutions of this nature are rare. Normally the multiple solutions which do occur differ from each other only in a few squares along the edge of the closed curve. The "error" introduced by the occasional ambiguous solutions are usually well within the errors present in originally gathering the input data.

It will often occur in application of the Northwest Corner Rule that one of the arbitrarily assigned values leads to no valid solution and in that situation no ambiguity at all exists. It may also occur in application of the Northwest Corner Rule that application of the nine rules of the first part of algorithm may lead to another "dead end" in which no additional proven 1's or proven 0's can be added to the matrix based on application of the nine rules alone. In that case the Northwest Corner Rule is again applied by successively adding a 1 and a 0 in another Northwest corner square as hereinabove described, and the nine rules of the algorithm are then applied with successive applications of the Northwest Corner Rule being employed as required until a solution is obtained. It will be recognized that it is possible at each application of the Northwest Corner Rule to double the number of possible solutions. It is found, however, that this does not ordinarily occur and many of the applications of the Northwest Corner Rule result in one of the arbitrary assignments yielding a situation where no solution is possible, such as, for example, a situation where an x or y concavity occurs or a line is filled with proven 0's and less than a sufficient number of proven 1's. These and other similar anomalous results are rejected.

GENERAL PURPOSE COMPUTER SOLUTION

The algorithm set forth can be worked out by hand, however, it is apparent that for a large matrix the procedure is cumbersome and time consuming. It is therefore desirable to employ a computer to perform the large number of individually simple operations involved in a large matrix. A person skilled in the art of programming general purpose computers can readily implement the algorithm merely from the verbal rules set forth hereinabove and such general purpose computer programs have been written for three different models of computer, namely an International Business Machine Model 7094, an International Business Machine System 360 Model 40/65 and a Control Data Corporation Model 6600, all in Fortran IV language. If desired, the logical relations of the Rules can be set forth in algebraic terms which are obviously readily translated into a program for a particular general purpose computer.

Although other algebraic expressions are suitable, one typical expression is set forth hereinafter as an example. In this the value (0 or 1) to be entered in a given $x,y$ location in the matrix is designated as $A_{x,y}$. Thus when $A_{x,y} = 1$, a 1 is entered in space $x,y$. Likewise as hereinabove defined, the highest and lowest $x$ values of squares occupied by 1's are designated as $x_{max}$ and $x_{min}$ respectively for a given row $y$, and the width of the row is designated as $n$. The algebraic expressions given as an example are for rows and it will be apparent that exactly analogous equations are true for columns. In the example, Rule (5) is not stated since it is the same as Rule (1) except for substitution of $n'$ for $n$ where $n'$ is $n$ minus the total number of squares at the ends of the row already occupied by proven 0's as pointed out hereinabove. Rule (6) is also not stated since in mechanization the function is performed by Rule (4). Further, for these exemplary equations, let $r$ and $s$ be two columns intersecting the row $y$.

Rule (1) $A_{x,y} = 1$, if $(n - Ay + 1) \leq x \leq A_y$.

Rule (2) $A_{x,y} = 0$, if $1 \leq x \leq (x_{max} - A_y)$, or $(x_{min} + A_y) \leq x \leq n$.

Rule (3) $A_{x,y} = 1$, if $x_{min} < x < x_{max}$.

Rule (4)(a) Let $s > r + 1$, then
$A_{1,y} = A_{2,y} \ldots A_{r+1,y} = 0$, if
$A_{r,y} = 0$, and $A_y < r$.

Rule (4)(b) Let $s > r + 1$; then
$A_{r+1,y} = A_{r+2,y} + \ldots A_{s-1,y} = 0$, if
$A_{r,y} = 0$, and $A_{s,y} = 0$, and $s - r < A_y$.

Rule (7) Let $s > r + 1$; then
$A_{1,y} = A_{2,y} \ldots A_{r+1,y} = A_{r+1,y} = A_{s+2,y} = \ldots A_{n,y} = 0$, if
$A_{r+1,y} = A_{r+1,y} = \ldots A_{s,y} = 1$, and $s - r + 1 = A_y$.

Rule (8) Let $s > r$; then
$A_{r+1,y} = A_{r+2,y} = \ldots A_{s-1,y} = 1$, if
$A_{1,y} = A_{2,y} = \ldots A_{r,y} = A_{s,y} = A_{s+1,y} = \ldots A_{n,y} = 0$, and
$s - r - 1 = A_y$.

Rule (9)(a) $A_{2,y} = A_{3,y} = \ldots A_{r,y} = 1$, and
$A_{r+1,y} = A_{r+2,y} = \ldots A_{n,y} = 0$, for
$r = A_y$, if $A_{1,y} = 1$; or
$A_{n-1,y} = A_{n-2,y} = \ldots A_{n-r,y} = 1$, and
$A_{r-1,y} = A_{r-2,y} = \ldots A_{1,y} = 0$, for
$r = A_{y-1}$, if $A_{n,y} = 1$.

Rule (9)(b) Let $s = r + 1$; then
$A_{r-1,y} = A_{r-2,y} = \ldots A_r A_{x+1,y} = 1$, and
$A_{1,y} = A_{2,y} = \ldots A_r A_{x,y} = 0$, if
$A_{4,y} = 1$, and $A_{s,y} = 0$; or
$A_{s+1,y} = A_{s+2,y} = \ldots A_s + A_{x-1,y} = 1$, and
$A_{s+} A_{x,y} = A_{s+} A_{x+1,y} \ldots A_{n,y} = 0$, if
$A_{r,y} = 0$ and $A_{s,y} = 1$.

It is found in one example of actual programming of the algorithm on a general purpose computer that Rules (3), (4), (7), (8) and (9) are conveniently implemented by a judicious choice of the technique for identifying the sub-region outside the closed curve and the sub-region within the closed curve. This leaves then only Rules (1), (2) and (5) to be explicitly implemented and Rules (1) and (5) are identical except for the starting conditions. It is apparent that Rule (1) for finding overlap of 1's and Rule (2) for finding 0's next to a margin are simple sub-routines involving merely additions, subtractions and comparisons.

The technique for identifying sub-regions is preferably one where the boundaries of the sub-regions are stored rather than the content of the subregions. Therefore, since Rules (3), (4), (7), (8) and (9) are "fill-in" rules, they need not be explicit in the computer program.

The storage of the sub-region boundaries can be exemplified by consideration of the rows in a matrix. In a row the boundary of the 0's adjacent the left margin is stored merely by noting the column number $d$ in which the last 0 before the first 1 is proven. The sub-region within the curve is defined by the column number $e$ in which the first 1 in the row is proven and the column number $f$ in which the last 1 in the row is proven ($e$ and $f$ are equal when there is only one proven 1 in a row). The 0's adjacent the right margin are defined by the column number $g$ in which the first 0 after the last 1 is proven. Since it is implicit that 0's are present between the side margins and columns $d$ and $g$, respectively, and 1's are present between the extreme proven 1's in columns $c$ and $f$, there is no further requirement for the fill-in rules. With this designation of the boundaries, any hiatus between a proven 0 and a proven 1 is readily considered to be "undecided" without raising any complications in binary numbers as is the case when proven 0's may have to be stored as "machine" or "logical" 1's. The designation is also convenient in programming Rules (1) and (2) since the only values needed for these rules are the input data $A_y$, the matrix size $n$, and the column numbers or $x$ values for the first and last 1's, $e$ and $f$ respectively.

The designation can be illustrated by reference to the exemplary closed curve hereinabove described and illustrated in FIG. 11. This curve is also presented in FIG. 13 in slightly modified format to better illustrate the nomenclature. As illustrated in this FIGURE rows are added to the top and bottom and columns to each side with these added rows and columns completely filled with 0's. This provides an initial column number (or row if desired) for the first and last 0 in a row before any 0's are proven. It is also convenient to use the same initial column numbers for the last and first 1's, respectively, in row in the initial storage. Thus in a computer memory before any comparisons are made, each row of the exemplary problem is considered to have the last zero before the first 1 in column 0, the first 1 in column 8, that last 1 in column 0 and the first 0 after the last 1 in column 8. From these initial locations of "proven" 0's and 1's, the boundaries are converged by successive applications of the mathematical relations of Rules (1) and (2) to the rows and columns. The last 0 before the first 1($d$) converges towards the first 1($e$) and the last 1($f$) and first 0 after the last 1($g$) converge. When the column numbers for 1's and 0's are but one unit apart, the boundaries have completely converged and program iteration is ceased.

Table I sets out the column numbers for the boundaries in the rows of the example of FIG. 13 and also the row numbers for the boundaries in the columns. Thus, for example, in the first row, the last 0 before the first 1($d$) is in column 3, and the first 0 after the last 1($g$) is in column 5. It so happens in this row that there is only a single 1 in the row and therefore the first 1($e$) and the last 1($f$) are both in column 4. Row 6 is of interest since the last 1 is at the boundary of the matrix as formerly set forth in FIG. 11, as indicated by a column number of 7 for $f$. The column number $g$ for the first 0 after the last 1 is 8, thereby employing the extra column of 0's added to the right side of the prior matrix. Table I also sets forth the row numbers for the columns of FIG. 13. It will be seen that these designations define the same closed curve as the column numbers did for the rows.

TABLE I

| Row | $d$ | $e$ | $f$ | $g$ |
|---|---|---|---|---|
| 1 | 3 | 4 | 4 | 5 |
| 2 | 3 | 4 | 5 | 6 |
| 3 | 3 | 4 | 5 | 6 |
| 4 | 2 | 3 | 6 | 7 |
| 5 | 1 | 2 | 6 | 7 |
| 6 | 1 | 2 | 7 | 8 |
| 7 | 0 | 1 | 5 | 6 |
| 8 | 1 | 2 | 3 | 4 |
| 9 | 2 | 3 | 3 | 4 |

| Column | $d$ | $e$ | $f$ | $g$ |
|---|---|---|---|---|
| 1 | 6 | 7 | 7 | 8 |
| 2 | 4 | 5 | 8 | 9 |
| 3 | 3 | 4 | 9 | 10 |
| 4 | 0 | 1 | 7 | 8 |
| 5 | 1 | 2 | 7 | 8 |
| 6 | 3 | 4 | 6 | 7 |
| 7 | 5 | 6 | 6 | 7 |

With a designation of the boundaries of the 0's sub-region and the 1's sub-region a minimum amount of computer memory is needed since only four numbers need be stored for each row and column. These numbers are employed in comparisons during computation and are changed as indicated by the comparisons until the sub-region boundaries converge and computation is completed.

Although there is described much detail of the basis for a typical programming of a computer, it will be apparent that programming the Rules by a competent computer programmer can be achieved from the Rules themselves. In fact this has been done in another model of computer with larger, more sophisticated memory wherein the regions within and without the closed curve are identified element by element in the matrix. The implementation of the Rules in this program is somewhat more direct and most of the "fill-in" rules are also included.

SPECIAL PURPOSE COMPUTER

As pointed out hereinabove the algorithm for finding the shape of a cross-section of a hidden body can readily be implemented by a program for a general purpose computer so that the shape of the cross-section can be determined more rapidly for a large matrix than by a hand technique. The programming of a general purpose computer to determine the shape is quite effective for situations where the $A_x$ and $A_y$ data are consistent and the solution may proceed to completion with one or more shapes determined.

It may happen in practical situations, however, that inconsistent input data is involved so that a solution, whether worked out by hand or by computer, indicates that both a "proven" 1 and a "proven" 0 occur in the same matrix location. This type of an inconsistency can very well arise in practical situations where measurement errors and rounding off to convert analog information to digital information are not uncommon. Thus, for example, due to the aforementioned errors it is often found that densitometer scans of two X-ray photographs of an object, for example, yield $A_x$ and $A_y$ digital curves which do not have identical areas thereunder.

Although many types of general purpose computer programs capable of handling inconsistent data can be written, optimum operation may in some circumstances preferably employ adjustment of inconsistent data based on partial solutions and, thus, involve the type of judgment that a skilled operator can employ. In this situation the proven regions within and without the closed curve are found to the extent possible by application of the above described rules and then human judgment is employed to select a best variation from the inconsistent data to form a closed curve in accord with other evidence and experience. For this purpose it is often desirable to employ a special purpose digital computer so that an economical display of the solution at all stages is continuously available and provision is made for convenient human interaction with the computer at any stage during operation thereof. Such a special purpose digital computer is described, illustrated and claimed in copending U.S. Pat. application, No. 800,222, entitled "Apparatus For Determining Shape" by Frederick Hartmann and Billy J. Huffmann, and assigned to North American Rockwell Corporation, assignee of this application. The disclosure of such co-pending application is hereby incorporated by reference for full force and effect as if set forth in full herein.

Such a special purpose digital computer for finding the shape of a cross-section from measurements of the thickness of an object as viewed in two directions, and which operates according to the rules of the algorithm set forth above, is illustrated in block diagram form in FIG. 15. As illustrated in this embodiment, there is provided a data input system 40 which in a preferred embodiment is a conventional photoelectric punched tape reader or magnetic tape reader. In addition, manual switches are provided for data input to the computer for resolving data inconsistencies as may be noted in operation of the computer. The data input system 40 enters the $A_x$ and $A_y$ thickness profile data in digital form, into a memory matrix 41 by way of a forward counter 42 and a backward counter 43.

In a preferred embodiment the memory matrix 41 comprises a conventional magnetic core memory which, for example, may comprise a 16,384 word, 24 bit core memory such as is readily commercially available. Such a memory has 24 planes of memory cores with each core plane having 16,384 individual cores in 128 rows of 128 cores each. Thus each plane can be considered to have 128 rows and 128 columns. The designation of an $x$ and a $y$ value identifies a location in the rows and columns of all of the core planes and such memory can store a 24 bit binary number at a given $x,y$ location. In this special purpose computer, however, the individual cores are individually employed and read by selecting one core plane (or more) and a given $x,y$ location. Binary numbers are not recorded as such in the memory. It should also be apparent that the 16,384-word memory provides a matrix in each core plane 128 elements high and 128 elements wide as compared with the 7 × 9 element matrix employed in the sample problem hereinabove worked out on a step-by-step basis.

A significant factor in providing for interaction of human judgement with the special purpose computer involves a display device 44 for continuously displaying selected results or interim results of operation of the computer as well as the completed solution. The display device 44 in a preferred embodiment comprises a conventional oscilloscope or similar cathode ray tube (CRT) display. An oscilloscope is a convenient display device since the power supplies, gain controls, and the like are contained in a single commercially available package. In addition, the display device 44 may include digital to analog converters (not separately shown in FIG. 15) for converting the digital information processed in the computer to analog information for display on the cathode ray tube. It will also be apparent that the display device may include means for providing a permanent record of computer results. It has been found convenient for many purposes to merely photograph the face of the cathode ray tube at the completion of the program in order to store the results.

The display on the face of the cathode ray tube or similar display device 44 is preferably in the form of a matrix of dots with each of the dots corresponding to a space or square of the matrix. Each dot then represents a given $x,y$ location in the matrix and the intensity of each dot is employed for indicating the state of a memory core corresponding to the same $x,y$ location in the memory matrix 41.

In order to generate a display matrix or raster, $x$ and $y$ deflection control for the cathode ray tube is provided by a matrix scan control 46. The matrix scan control 46 scans successive rows (or columns) of the matrix in the same general manner as a conventional television raster scan. It is preferred, however, to employ a digital counter (not separately shown) for the matrix scan deflection voltages for the cathode ray tube 44 and therefore the deflection voltages are in digital steps in both vertical and horizontal directions. This, therefore, produces a matrix of dots extending in vertical and horizontal directions rather than a continuum on the display device. As the matrix scan control deflects the electron beam of the display cathode ray tube to successive spots in the matrix the same control is also applied to the memory matrix 41 so that memory information in the matrix is sampled in synchronization with the display matrix sweep. Thus, at a given $x,y$ location the state of the cores in that $x,y$ location in the core memory are read (or written) at the same time as the corresponding spot on the face of the display device 44 is 44 is preferably in the form of a matrix of dots with each of the dots corresponding to a space or square of the matrix. Each dot then represents a given $x,y$ location in the matrix and the intensity of each dot is employed for indicating the state of a memory core corresponding to the same x,y location in the memory matrix 41.

In order to generate a display matrix or raster, x and y deflection control for the cathode ray tube is provided by a matrix scan control 46. The matrix scan control 46 scans successive rows (or columns) of the matrix in the same general manner as a conventional television raster scan. It is preferred, however, to employ a digital counter (not separately shown) for the matrix scan deflection voltages for the cathode ray tube 44 and therefore the deflection voltages are in digital steps in both vertical and horizontal directions. This, therefore, produces a matrix of dots extending in vertical and horizontal directions rather than a continuum on the display device. As the matrix scan control deflects the electron beam of the display cathode ray tube to successive spots in the matrix the same control is also applied to the memory matrix 41 so that memory information in the matrix is sampled in synchronization with the display matrix sweep. Thus, at a given x,y location the state of the cores in that x,y location in the core memory are read (or written) at the same time as the corresponding spot on the face of the display device 44 is illuminated. Thus the display dots or elements correspond exactly to memory words in the memory 44.

The intensity of the dots on the display cathode ray tube indicates the content of one or more of the core planes in the memory as determined by a memory plane selector, 47. The memory plane selector comprises a bank of manual switches for selectively displaying the content of one or more of the core planes on a display device. Thus for example if the memory core plane selector is set for core plane 1 in the memory, the content of this core plane is displayed on the cathode ray tube. The beam intensity in the cathode ray tube is varied by an intensity controller 48 to provide different discrete dot brightnesses to display the presence or absence of 1's and 0's in the memory. Normally the dots on the display are just barely illuminated so as to be distinguishable from the background on the cathode ray tube. Normally a dot of higher intensity represents a logical 1 in the memory core plane selected for display on the cathode ray tube. A lesser intensity dim dot is also provided so that the two separate core planes can be displayed simultaneously on the cathode ray tube. This provides the ability for example, to display proven 1's at a selected stage of computation with medium intensity dots and display proven 0's with lesser intensity dots. Thus regions within and without the curve are identified and dots having only background illumination indicate the areas still to be solved. A single bright dot may also be provided for marking a site in the matrix where inconsistent data is encountered so that the operator may make a judgment as to the best variation to be made in the input data to resolve the inconsistency.

In operation the computer proceeds in a plurality of individual steps each of which has selected logical sequences. These pre-programmed steps are selected and operated by a program step counter 49 which advances in response to the matrix scan control 46 providing an indication that an entire matrix scan has been concluded and therefore the programmed step is completed. Each program step provides a single scan of the entire matrix, however, during this single scan of the matrix each row (or column) may be scanned one, two, or three times as determined by a scan counter 50 and the particular program step being performed at a given time.

Broadly, the computer proceeds in two major stages each of which has several steps controlled by the state of the program step counter 49. The first stage comprises program step counter states P0, P1, and P2 and this stage is performed once at the commencement of a problem solution and is not repeated. The second stage comprises program counter states P3 through P11 and this cycle of steps is repeatedly iterated until a solution is obtained or is blocked by inconsistent data causing an automatic stop. The several program step counter states and operations of the computer during these counter states are outlined in Table III.

In program counter state P0 the $a_x$ data is stored in memory matrix core planes 1 and 2. In core plane 1 the $A_x$ data is stored adjacent the bottom margin of the matrix as logical 1's as illustrated in FIG. 16A and in core plane 2 the data is stored adjacent the top margin of the matrix as illustrated in FIG. 16B. It will be recognized that these data are from the same problem hereinabove worked out step by step. The 1's and 0's illustrated in FIGS. 16A and 16B represent the state of individual memory cores at the various x and y locations in the first and second core planes of the memory matrix, respectively. These are logical 1's and 0's as distinguished from proven 1's and 0's, the former being temporarily employed in operation of the computer and the latter being identifiers for regions within and without a curve representing the cross-section. As pointed out hereinafter logical 1's in memory core plane 5 correspond exactly to proven 1's; and logical 1's stored in memory core plane 6 actually represent proven 0's.

In order to store the $a_x$ data in core plane 1 during program step counter state P0 the $a_x$ value from the data input 40 is employed to preset the backward counter 43 to the binary number for a given column.

TABLE III

| Program step counter state | Process performed | Stored in core plane | Counter | Scan direction and read/write function in core plane (i) | | |
|---|---|---|---|---|---|---|
| | | | | First | Second | Third |
| First Stage: | | | | | | |
| P0 | Store $A_x$ | 1 | Backward | Right—write (1) | | |
| P0 | Store $m\text{-}A_x$ | 2 | Forward | Right—write (2) | | |
| P1 | Store $A_y$ | 3 | Backward | Up—write (3) | | |
| P1 | Store $n\text{-}A_y$ | 4 | Forward | Up—write (4) | | |
| P2 | (1)(2)+(3)(4) | 5 | | Right—write (5) | | |
| Second Stage: | | | | | | |
| P3 | (5)y max.−(1) | 6 | Backward | Down—read (5)+(1) | Up—write (6) | |
| P4 | (5)y min.−(2) | 6 | Forward | Up—read (5)+(2) | Down—write (6) | |
| P5 | (5)x max.−(3) | 6 | Backward | Left—read (5)+(3) | Right—write (6) | |
| P6 | (5)x min.−(4) | 6 | Forward | Right—read (5)+(4) | Left—write (6) | |
| P7 | (6)y min.+(1) | 7 | do | Up—read (6) | Up—read (1) | Down—write (7). |
| P8 | (6)y max.+(2) | 8 | do | Down—read (6) | Down—read (2) | Up—write (8). |
| P9 | (6)y min.+(3) | 9 | do | Right—read (6) | Right—read (3) | Left—write (9). |
| P10 | (6)x max.+(4) | 10 | do | Left—read(6) | Left—read (4) | Right—write (10). |
| P11 | (7)(8)+(9)(10) | 5 | | Up—write (5) | | |

The column is then scanned upwardly and the backward counter counts down from the preset value of $A_x$ for that column until reaching 0 at which time the backward counter stops. A logical 1 is entered in memory core plane 1 in each y location where the backward counter is not at 0, that is, logical 1's are entered at the bottom of the matrix in the number of spaces required to count from the thickness value $A_x$ down to 0. This is seen in FIG. 16A wherein the second column an $A_x$ value of 4 is entered in the backward counter and four counts are needed to count down to zero. During these counts logical 1's are entered in the four bottom spaces. Thereafter the backward counter is at 0 and logical 0's are entered in the balance of the column.

After the column is scanned with the backward counter providing data input for the memory matrix, the $A_x$ data for the next column is entered in the backward counter and that column scanned. In this manner, the entire matrix is scanned upwardly column by column, commencing at the left and proceeding to the right-most column.

At the same time in program counter state P0 the $A_x$ data is entered as a preset number in the forward counter 42. As the individual columns are scanned upwardly, the forward counter also commences counting from the preset value and proceeds to count to a maximum equal to the height of the matrix. After reaching the maximum count it advances one additional count to 0 (resets to 0) and remains at 0 for the balance of the scan of that column. A logical 1 is entered in memory core plane 2 at all points where the forward counter is at 0. This data entry occurs simultaneously with data entry in core plane 1, both counters operating during each column scan. The data entry can be seen in FIG. 16B where, in the second column the forward counter is present to 4 and five additional counts are needed to reach the maximum value of 9 corresponding to the matrix height. During these five counts the forward counter is not at 0 and logical 0's are entered in core plane 2. After these five counts, the counter is at 0 and logical 1's are entered.

In program step counter state P1 the $A_y$ data is stored in a similar manner in memory core planes 3 and 4 adjacent the left and right margins of the matrix, respectively.

In program step counter P2 the overlap of $A_x$ data in core planes 1 and 2 and the overlap of $A_y$ data in core planes 3 and 4 is found and logical 1's (proven 1's) are entered in memory core plane 5 in the region where an overlap is present in either of these combinations. This can be stated in conventional logical terminology as $(5) = (1)(2) + (3)(4)$. A partial representation of this is illustrated in FIG. 16 wherein FIG. 16A illustrates the $A_x$ data at the bottom edge of the matrix and FIG. 16B illustrates the input $A_x$ data arrayed along the upper margin of the matrix. It will be apparent that any region of overlap of logical 1's in these two core planes must lie within the closed curve representing the cross-section as set forth in Rule (1) hereinabove. Any location where a logical 1 is present in both core planes 1 and 2 must be a location where a proven 1 exists. In FIGS. 16A and 16B a central region is outlined and it can be seen that within this region logical 1's are present in both core planes 1 and 2 and such is not the case at any point outside of the bounded region. These points then represent proven 1's, and logical 1's may be entered in memory core plane 5 at corresponding locations as illustrated in FIG. 16C. It should be noted that the logical 1's in core plane 5 as represented in FIG. 16C are proven 1's; however, the 0's in this core plane bear no relation whatsoever to proven 0's but only represent the absence of a proven 1. It should also be recognized that FIG. 16C represents the proven 1's found only by overlap of $A_x$ data as illustrated in FIGS. 16A and 16B. Simultaneously with noting the overlap of these two core planes the contents of memory cores 3 and 4 are also scanned and overlap of $A_y$ data in these core planes is also entered in memory core plane 5 during program step counter state P2.

This completes the first stage of operation of the computer in solving a given problem and this stage is not repeated. The second stage comprising program states P3 through P11 may be iterated a large number of times until a program solution is obtained.

Program counter states P3 through P6 implement Rule (2) of the above stated algorithm and proven 0's are entered in memory core plane 6 at the bottom, top, left, and right sides of the matrix, respectively. Program counter state P3 is typical of the operations of the computer in these four program states. In counter state P3 the $A_x$ value is subtracted from the $y$ value of the top proven 1 ($y$ max) in each column as recorded in memory core plane 5 and the result is stored as logical 1's (proven 0's) in memory core plane 6.

In order to accomplish this each column in the matrix is scanned twice before proceeding to the next column as the entire matrix is scanned. On the first scan of the column, reading of the memory matrix proceeds from the top down, and on the second scan writing in the memory matrix proceeds from the bottom up in the same column. On the first or downward scan the backward counter is preset to a maximum equal to the matrix height (nine in this example) and counts down from this value when there is an appropriate input. The backward counter counts as the scan proceeds downwardly for every space in which a 0 is present in memory core plane 5 before a logical 1 is first encountered in the same memory core plane. Upon reaching the first proven 1 in memory core plane 5 the backward counter is stopped unless it is caused to continue to count as hereinafter described. In the downward scan the backward counter is also caused to count by logical 1's stored in memory core plane 1 independently from the content of core plane 5. Thus, one of two conditions may occur in the downward scan: either a logical 1 is first encountered in memory core plane 5 before the first logical 1 in memory core plane 1, in which case the backward counter stops counting at the first logical 1 in core plane 5 and resumes counting at the same count at the first logical 1 in memory core plane 1; or a logical 1 may occur at a higher value in memory core plane 1 than in memory core plane 5, in which case the count would continue without a hiatus since either of these inputs will cause a count in the backward counter independent of the other.

It will be apparent that, by commencing at the maximum and counting down as the column is scanned down, upon reaching the highest proven 1 in memory core plane 5, the count on the backward counter equals the $y$ value of this 1 which can be known as $y$ max. When the count resumes it proceeds for the number of counts of the input $A_x$ data in that column and since being counted downwardly the net result is a subtraction of the $A_x$ data as stored in core plane 1 from the highest proven 1 ($y$ max) stored in the memory core plane 5. This is the value of the count in the backward counter upon reaching the bottom of the first downward scan in program step counter state P3. The count on the backward counter proceeds from that value and counts downwardly as the second scan proceeds up along the same column until reaching 0 when the count ends. A logical 1 (proven 0) is entered in memory core plane 6 at each point where the backward counter is not at 0. Upon counting down to 0 in an upward scan the backward counter remains at 0 and no additional logical 1's are entered in memory core plane 6 in this scan. This provides a series of proven 0's adjacent the lower margin of the matrix in partial implementation of Rule (2) of the above stated algorithm.

The operation in counter state P3 can be exemplified in FIG. 17 wherein FIG. 17A illustrates the content of memory matrix core plane 5 after counter state P2 is completed and FIG. 17B illustrates the content of memory core plane 6 after completion of state P3. In the first column the backward counter starts at 9, the maximum for this matrix and counts down so long as logical 0's are present in memory core plane 5 before a logical 1 (proven 1) is encountered. Since there are no logical 1's in this column the count proceeds to 1 in the downward scan and steps to 0 in the first space on the upward scan. Since at 0 for the entire upward scan, no logical 1's are entered in core plane 6. In the second column the count also starts at 9 and counts down to 4 since logical 0's are present in core plane 5. At this point a logical 1 is encountered and the signal from core plane 5 causing counting is ended. However, the count continues since a logical 1 is encountered in core plane 1 at this same point as seen in FIG. 16A. The backward count continues for the balance of the downward scan and is again at 0 for the entire upward scan.

In the penultimate column in the example, the backward count ends at 4 upon reaching the first logical 1 in core plane 5. There is no logical 1 in core plane 1 at this location to cause continued counting. The count, however, resumes one space later when the first 1 is encountered in the $A_x$ data in core plane 1, and continues down to count 2 at the bottom of the scan. The count proceeds to 1 in the first space on the upward scan and to 0 in the second space. A logical 1 is entered in core plane 6 whenever the backward counter is not at 0, therefore a single logical 1 is entered at the bottom margin in this column as seen in FIG. 17B. One can see this represents a proven 0 by noting that the input $A_x$ data value of 3 cannot extend to the lowermost space when superimposed on the proven 1 in that column in core plane 5. In program counter states P4 through P6 the same general operations occur with varying scan directions as outlined in Table III, and proven 0's are entered along the top, left, and right margins of the matrix, respectively, in a manner substantially identical to that in program counter state P3.

During program counter states P7 through P11 Rules (3), (4), (5), (7) and (8) are executed. In general it is not found necessary to specifically implement Rules (6) and (9) for large matrixes since these special situations are accounted for in executing the other rules of the algorithm. Rule (8) is actually a special case of Rule (5) and is executed therewith and Rule (7) is executed upon iteration of Rule (2) after implementing the other rules. In program step counter states P7 through P10 the $A_x$ or $A_y$ input data is added to the number of proven 0's adjacent each margin, respectively, and the resultant sums are stored in memory core planes 7 through 10, respectively. This operation is a preparatory step for execution of Rule (5) of the algorithm and also implements the fill-in Rules (3) and (4).

In program counter state P11 Rule (5) is completed by finding the overlap of the stored sums in memory core planes 7 and 8 or core planes 9 and 10 in a manner substantially identical to that pointed out hereinabove in relation to program step counter state P2. This overlap establishes a new enlarged region of proven 1's and is employed to update the information in memory core plane 5 which records proven 1's. After program counter state P11 the computer returns to program counter state P3 and iteration of states P3 through P11 continues until no change in proven 1's or proven 0's is obtained.

In program counter state P7 which is representative of states P7 through P10 the number of proven 0's adjacent the bottom margin is added to the $A_x$ data and this sum is stored in the columns extending upwardly from the bottom margin. This is accomplished by three scans of each column, the first two scans proceeding upwardly and the third scan proceeding downwardly as summarized in Table III. On the first upward scan the forward counter commences at 0 and counts upwardly so long as proven 0's (logical 1's) are encountered in memory core plane 6 commencing at the lower margin. Upon reaching the first space in which a logical 1 is not present the forward counter is stopped and does not resume counting in the first scan even though additional proven 0's may be encountered near the upper margin. On the second upward scan the input $A_x$ data stored in memory core plane 1 is read with the forward counter proceeding one count whenever a logical 1 is encountered in memory core plane 1 in the second scan. Thus at the end of the second scan the content of the forward counter is the sum of the proven 0's adjacent the bottom margin and the input $A_x$ data for that column. The order of the two upward scans can, of course, be exchanged since a sum is obtained.

On the third downward scan in the program step counter P7 the forward counter resumes counting at the sum found in the first two scans and counts continuously to the maximum (matrix height) and past to 0 and remains at 0 for the balance of the downward scan. A logical 1 is entered in memory core plant 7 at all points where the forward counter is at 0. This provides an array of logical 1's adjacent the bottom margin of the matrix equal to the sum of the input $A_x$ data and proven 1's adjacent the bottom margin for each of the columns.

The counting can be exemplified in the diagrams of FIG. 18 wherein FIG. 18A illustrates the content of memory core plane 6 after an iteration of program counter states P3 through P6 and FIG. 18B illustrates the content of memory core plane 17 at the end of state P7 for the same example worked out step by step hereinabove. In this particular example, therefore the principal portion of core plane 7 is identical to the content of memory core plane 1 since nothing has been added thereto. In the penultimate column the logical 1 at the bottom margin in core plane 6 is added to the input $A_x$ data (FIG. 16A) for that column and an additional logical 1 is present as indicated by underlining in FIG. 18B.

In program counter states P8, P9, and P10 an exactly similar process occurs for entering the respective sums as outlined in Table III along the top, left, and right margins, respectively, of the matrix.

The content of memory core plane 8 at the end of the program counter state P8 is illustrated in FIG. 18C with the 1's of the input data from core plane 2 appearing plain and those added thereto from the upper margin of core plane 6 appearing underlined. The increased information is apparent when FIG. 18C is compared with FIG. 16B which is the original input data.

As pointed out hereinabove in program step counter state P11 the overlap in core planes 7 and 8 or 9 and 10 is found and these additional proven 1's are entered in memory core plane 5.

This also is exemplified in FIG. 18 wherein FIG. 18D illustrates the updated proven 1's in memory core plane 5 as provided in program counter state P11 due to overlap in core planes 7 and 8 which are illustrated in FIGS. 18B and 18C, respectively. It will be seen that this operation has added a new proven 1, as indicated by underlining, as compared with the proven 1's established at the end of counter state P2 as illustrated in FIG. 17A. After completing the entry of proven 1's in core plane 5, the operations of program step counter states P3 through P11 are repeated cyclically to find additional proven 0's and proven 1's until a complete problem solution is obtained.

Additional detailed information and logical relations of the described special purpose computer operating in this general manner are set forth in the abovementioned copending U. S. patent application which is incorporated herein by reference.

It will be apparent to one skilled in the art that many variations and modifications may be made in practice of this invention. Thus, for example, other energy sources, detection techniques, and hidden objects than mentioned hereinabove may be involved. Variations in the algorithms for reconstructing the shape, identifying inconsistent data and the like can also be provided. In addition, multiple views of the same cross-sectional shape can be employed rather than the two views set forth and the cross-sections of several regions in the same matrix can be determined, whether the several regions are separate or overlapping as in the case of a marrow cavity within a bone within a body of flesh.

ALTERNATIVE SHAPE DETERMINATION

An alternative technique for determining the shape of a cross-section can be employed once the height and width data are known for the cross-section. The technique is readily implemented with a special purpose computer or is readily implemented by programming a general purpose computer. In this technique all potential solutions are examined or precluded in the course of examination so that all possible cross-sections are identified.

The task of examining all possible cross-sections to see which would have width and height values consistent with the width and height values measured would, upon first consideration, appear to involve an unrealistically large requirement for computer memory and operating time, particularly in a large matrix. This is, however, not the case since the technique can be compared to a tree with many branches, with the examination of possible cross-sections starting at the base of the tree and proceeding upwardly to the branches. Certain exclusionary rules are involved in examining the possible cross-sections to identify forbidden formations of the region bounded by the closed curve. When any of these exclusionary rules operate, the entire branch with all of the additional possible cross-sections on that branch is thereupon precluded and need not again be considered.

Thus, the technique is to consider all solutions representing cross-sections commencing at one edge of the matrix and tentatively placing contiguous sets of 1's (and hence 0's) in all feasible positions for each line of the matrix. When this operation is commenced a full matrix of solutions is apparently possible. However, certain formations of 1's are not permitted by exclusionary rules and when a forbidden formation is encountered all possible solutions containing this formation are precluded and therefore not attempted, thereby avoiding iteration for substantial segments of the potential matrix. Only those portions of the matrix wherein valid solutions may lie are subject to continued solution and there is a constant process of eliminating potential solutions until only the correct solution or solutions remain.

Solution by examining all possibilities has certain advantages over the previously described superposition algorithm. In the superposition algorithm it may be necessary to employ the so-called Northwest Corner Rule in order to identify all possible solutions when more than one acceptable solution is present. In the examination of all solutions it is apparent that all possible solutions will be identified in the normal course of the problem operation. Further, by adapting some of the exclusionary rules this technique identifies optimum solutions in case of inconsistencies (that is, where there would appear to be both a proven 1 and a proven 0 in a given location). This technique may also be employed for defining multiple regions within the same matrix or for determining the bounds of regions having a certain degree of concavity.

As in the superposition algorithm this technique employs a matrix of squares (or other spaces) arranged in columns and rows which for convenience are considered orthogonal, but which may obviously be at any angles. The total number of 1's in each column is identified by an $A_x$ value and the total number of 1's in each row is identified by an $A_y$ value just as in the superposition technique. It will also be considered that 1's are within the region and 0's without the region bounded by a curve.

Three additional symbols are introduced to identify quantities employed in the problem solution. The total number of 0's to the left of the first 1 in a row is called $Z_j$ where $j$ identifies a particular row by number, counting from the top down. The column in which the last 1 to the right is located in the set of 1's in a particular row $j$, is identified as $H_j$ which is, of course, equal to $Z_j + A_j$. A coefficient or remainder of remaining available 1's in a column $i$, after subtracting 1's assumed to lie in particular locations of rows of a trial solution, as described hereinafter, is identified as $C_i$.

In order to explain the problem solving technique a microproblem will be employed as set forth in FIG. 14A. As seen in this figure, the problem to be solved is a determination of the shape of the closed curve based only on the $A_y$ values, 1, 3, 4, 1 and the $A_x$ values, 1, 3, 2, 2, 1. Such a curve may represent a cross-section of a hidden object as hereinabove pointed out. The solution to this problem is set forth hereinafter as a series of steps and it will be apparent that the same steps are employed on a larger scale for a matrix larger than the 4 × 5 matrix employed in FIG.14A as an example. It will also be apparent that the successive steps are merely additions, subtractions, and comparison of added and subtracted values, all of which are readily programmed on a general purpose computer. The steps actually occurring in the computer program are substantially identical to those set forth hereinafter although they may be performed in slightly different order than introduced in the expository material to follow.

In order to explain the steps involved in a complete solution, Table II includes each of the successive steps, many of which are repetitive in nature as hereinafter pointed out. As a preliminary to the steps the $A_x$ values are entered in the Remainders columns $C_i$ in line 1 of Table II and are enclosed in parentheses to indicate that these values are for reference in performing the following steps. It will be apparent that in a computer mechanization of the steps that the $A_x$ values and remainder values later

TABLE II

| Line | Step | Last zero | | | | Last one | | | | Remainders | | | | | Rules |
|---|---|---|---|---|---|---|---|---|---|---|---|---|---|---|---|
| | | $Z_1$ | $Z_2$ | $Z_3$ | $Z_4$ | $H_1$ | $H_2$ | $H_3$ | $H_4$ | $C_1$ | $C_2$ | $C_3$ | $C_4$ | $C_5$ | |
| 1 | | | | | | | | | | (1 | 3 | 2 | 2 | 1) | |
| 2 | 1 | 0 | | | | 1 | | | | 0 | 3 | 2 | 2 | 1* | |
| 3 | 1 | 1 | | | | 2 | | | | 1 | 2 | 2 | 2 | 1* | |
| 4 | 1 | 2 | | | | 3 | | | | 1 | 3 | 1 | 2 | 1* | |
| 5 | 1 | 3 | | | | 4 | | | | 1 | 3 | 2 | 1 | 1* | |
| 6 | 1 | 4 | | | | 5 | | | | 1 | 3 | 2 | 1 | 0* | |
| 7 | | | | | | | | | | (0 | 3 | 2 | 2 | 1) | |
| 8 | 2 | 0 | 0 | | | 1 | 3 | | | −1 | | | | | A |
| 9 | 2 | 0 | 1 | | | 1 | 4 | | | 0 | 2 | 1 | 1 | 0 | B-1 |
| 10 | 2 | 0 | 2 | | | 1 | | | | | | | | | B-1 |
| 11 | | | | | | | | | | (1 | 2 | 2 | 2 | 1) | |
| 12 | 2 | 1 | 0 | | | 2 | 3 | | | 0 | 1 | 1 | 2 | 1* | |
| 13 | 2 | 1 | 1 | | | 2 | 4 | | | 1 | 1 | 1 | 1 | 1* | |
| 14 | 2 | 1 | 2 | | | 2 | | | | | | | | | B-1 |
| 15 | | | | | | | | | | (1 | 3 | 1 | 2 | 1) | |
| 16 | 2 | 2 | 0 | | | 3 | 3 | | | 0 | 2 | 0 | 2 | 1* | |
| 17 | 2 | 2 | 1 | | | 3 | 4 | | | 0 | 2 | 0 | 1 | 1* | |
| 18 | 2 | 2 | 2 | | | 3 | 5 | | | 1 | 3 | 0 | 1 | 0* | |
| 19 | | | | | | | | | | (1 | 3 | 2 | 1 | 1) | |
| 20 | 2 | 3 | 0 | | | 4 | 3 | | | | | | | | B-2 |
| 21 | 2 | 3 | 1 | | | 4 | 4 | | | 1 | 2 | 1 | 0 | 1* | |
| 22 | 2 | 3 | 2 | | | 4 | 5 | | | 1 | 3 | 1 | 0 | 0* | |
| 23 | | | | | | | | | | (1 | 3 | 2 | 1 | 0) | |
| 24 | 2 | 4 | 0 | | | 5 | 3 | | | | | | | | B-2 |
| 25 | 2 | 4 | 1 | | | 5 | 4 | | | | | | | | B-2 |
| 26 | 2 | 4 | 2 | | | 5 | 5 | | | 1 | 3 | 1 | 0 | −1 | A |
| 27 | | | | | | | | | | (0 | 1 | 1 | 2 | 1) | |
| 28 | 3 | 1 | 0 | 0 | | 2 | 3 | 4 | | −1 | | | | | A |
| 29 | 3 | 1 | 0 | 1 | | 2 | 3 | 5 | | 0 | 0 | 0 | 1 | 0* | |
| 30 | | | | | | | | | | (1 | 1 | 1 | 1 | 1) | |
| 31 | 3 | 1 | 1 | 0 | | 2 | 4 | 4 | | 0 | 0 | 0 | 0 | 1* | |
| 32 | 3 | 1 | 1 | 1 | | 2 | 4 | 5 | | 1 | 0 | 0 | 0 | 0* | |
| 33 | | | | | | | | | | (0 | 2 | 0 | 2 | 1) | |
| 34 | 3 | 2 | 0 | 0 | | 3 | 3 | 4 | | −1 | | | | | A |
| 35 | 3 | 2 | 0 | 0 | | 3 | 3 | 5 | | 0 | 1 | −1 | | | A |
| 36 | | | | | | | | | | (0 | 2 | 0 | 1 | 1) | |
| 37 | 3 | 2 | 1 | 0 | | 3 | 4 | 4 | | −1 | | | | | A |
| 38 | 3 | 2 | 1 | 1 | | 3 | 4 | 5 | | 01 | −1 | | | | A |
| 39 | | | | | | | | | | (1 | 3 | 0 | 1 | 0) | |
| 40 | 3 | 2 | 2 | 0 | | 3 | 5 | 4 | | 0 | 2 | −1 | | | A |
| 41 | 3 | 2 | 2 | 1 | | 3 | 5 | 5 | | 1 | 2 | −1 | | | A |
| 42 | | | | | | | | | | (1 | 2 | 1 | 0 | 1) | |
| 43 | 3 | 3 | 1 | 0 | | 4 | 4 | 4 | | 0 | 1 | 0 | −1 | | A |
| 44 | 3 | 3 | 1 | 1 | | 4 | 4 | 5 | | 1 | 1 | 0 | −1 | | A |
| 45 | | | | | | | | | | (1 | 3 | 1 | 0 | 0) | |
| 46 | 3 | 3 | 2 | 0 | | 4 | 5 | 4 | | 0 | 2 | 0 | −1 | | A |
| 47 | 3 | 3 | 2 | 1 | | 4 | 5 | 5 | | 1 | 2 | 0 | −1 | | A |
| 48 | | | | | | | | | | (0 | 0 | 0 | 1 | 0) | |
| 49 | 4 | 1 | 0 | 1 | 0 | | | | | | | | | | C-1 |
| 50 | 4 | 1 | 0 | 1 | 1 | 2 | 3 | 5 | 2 | 0 | −1 | | | | A |
| 51 | 4 | 1 | 0 | 1 | 2 | 2 | 3 | 5 | 3 | 0 | 0 | −1 | | | A |
| 52 | 4 | 1 | 0 | 1 | 3 | 2 | 3 | 5 | 4 | 0 | 0 | 0 | 0 | 0* | |
| 53 | 4 | 1 | 0 | 1 | 4 | 2 | 3 | 5 | 5 | 0 | 0 | 0 | −1 | | A |
| 54 | | | | | | | | | | (0 | 0 | 0 | 0 | 1) | |
| 55 | 4 | 1 | 1 | 0 | 0 | 2 | 4 | 4 | 1 | −1 | | | | | A |

Table II—Continued

| Line | Step | Last zero | | | | Last one | | | | Remainders | | | | | Rules |
|---|---|---|---|---|---|---|---|---|---|---|---|---|---|---|---|
| | | $Z_1$ | $Z_2$ | $Z_3$ | $Z_4$ | $H_1$ | $H_2$ | $H_3$ | $H_4$ | $C_1$ | $C_2$ | $C_3$ | $C_4$ | $C_5$ | |
| 56 | 4 | 1 | 1 | 0 | 1 | 2 | 4 | 4 | 2 | 0 | −1 | | | | A |
| 57 | 4 | 1 | 1 | 0 | 2 | 2 | 4 | 4 | 3 | 0 | 0 | −1 | | | A |
| 58 | 4 | 1 | 1 | 0 | 3 | 2 | 4 | 4 | 4 | 0 | 0 | 0 | −1 | | A |
| 59 | 4 | 1 | 1 | 0 | 4 | 2 | 4 | 4 | | | | | | | B−1 |
| 60 | | | | | | | | | | (1 | 0 | 0 | 0 | 0) | |
| 61 | 4 | 1 | 1 | 1 | 0 | 2 | 4 | 5 | 1 | | | | | | B−2 |
| 62 | 4 | 1 | 1 | 1 | 1 | 2 | 4 | 5 | 2 | 1 | −1 | | | | A |
| 63 | 4 | 1 | 1 | 1 | 2 | 2 | 4 | 5 | 3 | 1 | 0 | −1 | | | A |
| 64 | 4 | 1 | 1 | 1 | 3 | 2 | 4 | 5 | 4 | 1 | 0 | 0 | −1 | | A |
| 65 | 4 | 1 | 1 | 1 | 4 | 2 | 4 | 5 | 5 | 1 | 0 | 0 | 0 | −1 | A | set forth in the Table in parentheses are temporarily contained in a computer memory for use in the program.

In the first step of the solution it is assumed that the set of 1's ($A_y$) in the first row of the matrix can successively assume all feasible positions in that row. This position for the set of 1's is defined by the $Z_1$ and $H_1$ values; $Z_1$ being the number of 0's between the margin and the first 1 in the first row, and $H_1$ being the column position of the last 1 in the first row. In the selected example there is but a single 1 in the first row. It will first be assumed that the first 1 is in the upper left corner of the matrix; that is, the first space from the margin in row 1 as shown in FIG. 14B. Since this first 1 is adjacent the margin there are no 0's between it and the margin and $Z_1 = 0$, as seen in line 2 of Table II. The $H_1$ value is $Z_1 + A_y$; that is, $0 + 1 = 1$, which is entered in the $H_1$ column of line 2 of Table II. No values are entered for $Z_2$ et seq. or $H_2$ et seq. since at this point no 1's are assumed in these rows. These columns of the table will be employed in later steps.

If the set of 1's in the first row of the matrix is in the assumed position shown in FIG. 14B it will be apparent that the number of remaining 1's which can be located in each column of the matrix is diminished by any 1's already in that column due to the assumed location of 1's in the first row. Thus the $A_x$ values are diminished by 1 in each column in which a 1 is present. This is shown by the remainders $C_i$ shown at the bottom of FIG. 14B and also set forth in the Remainders columns of line 2 of Table II. This listing of remainders in Table II is marked with an asterisk to indicate that the remainders are employed in a subsequent step of the technique; that is, in a computer implementation these remainders are temporarily stored in a memory bank.

FIG. 14C illustrates the next assumed partial solution wherein the set of 1's in row 1 is in the next position possible. In this position the first 1 is in the second column, therefore, there is one 0 before the first 1, that is, $Z_1 = 1$ as indicated on line 3 of Table II. The position of the last 1 ($H_1 = Z_1 + A_y$) is in column 2 which is also entered on line 3 as $H_1 = 2$. The remainders, $C_i$, are for this partial solution 1, 2, 2, 2, 1 since 1 is subtracted from the $A_x$ value of 3 for column 2 in the matrix, and these remainders are also entered on line 3 of the table.

In a similar manner the set of 1's defined by the $A_y$ value is placed in all feasible locations in the first row as seen by the $Z_1$ values of 2, 3, and 4 on lines 4, 5, and 6 of Table II, indicating the number of zeros before the first 1. Corresponding $H_1$ values and remainders which are temporarily stored for further use are also presented in Table II.

The next or second step of partial solutions proceeds in the second row wherein the set of 1's in the second row is permitted to assume all feasible positions for each position of the set of 1's in the first row, that is, $Z_2$ may now assume all feasible values for each value of $Z_1$. For each of these positions it is determined whether a valid solution could be attained; if no valid solution is possible the case is rejected and if a valid solution is possible the case is containing a selected formation, the case is retained for further processing.

First, it is assumed that a first 1 in the first row of the matrix is in the first square; that is, $Z_1 = 0$; and that the first 1 in the second row is also in the first square; that is, there are no 0's before the first 1 and therefore $Z_2 = 0$. Since the second row has three 1's in the set $H_2 = 3$ when $Z_2 = 0$ and these values are indicated on line 8 of Table II. This position is also shown in FIG. 14D along with the remainders $C_i$ corresponding to the position $Z_1 = 0$ as shown in parentheses on line 7 of Table II.

The 1's in the second row are then subtracted from the remainder of 1's available for the assumed position of 1's in the first row. Thus, in the first column of the matrix, 1 is subtracted from 0 (the number of remaining available 1's); this, however, yields a negative number and it is clear that this cannot be included in a valid solution since too many 1's would be present in the first column. That is, the $A_x$ value for the first matrix column is only 1 and no more than a single 1 can appear in this column in any valid solution. Therefore, this formation (FIG. 14D) and all possible solutions containing this formation are precluded and do not have to be further considered.

This is an exclusionary rule which eliminates a group of possible solutions. This rule can be stated as:

Rule (A) Do not proceed if any $C_i$ is less than 0.

In the sample problem set forth herein there is no need to further investigate any possible solution containing the formation wherein $Z_1 = 0$ and $Z_2 = 0$. This result is indicated in the Remainders column of Table II by entry of a −1 in column $C_1$ of line 8 and the identification of Rule (A) in the final column of this table. In order to conserve computational steps, when a −1 is encountered as in column $C_1$ no further subtractions are made on that line.

The next position for the set of 1's in the second row still has $Z_1 = 0$, however, $Z_2 = 1$ and hence the last 1 is in the fourth column, or $H_2 = 4$ as shown in FIG. 14E. Subtraction of the 1's in row 2 in the various columns from the remainders ($C_i$) for the position $C_1 = 0$ appears acceptable under the aforementioned Rule (A) since there are sufficient remaining 1's in all of the columns. One constraint on possible solutions, however, is that the region bounded by the curve is all contiguous and does not degenerate into two separate regions within the matrix. An examination of FIG. 14E shows that the region of 1's in the two rows is not contiguous except at the corners; that is, the last 1 on the first row is a column removed from the first 1 in the second row. When this type of formation is encountered an unacceptable solution is identified, and all possible solutions including such a formation are forbidden and need not be further considered.

This type of formation can be detected numerically by noting the positions of the last 0 before the first 1 in one row and the last 1 in the successive row, or to find the same forbidden formation on the opposite side of the set of 1's, the positions of the last 1 and the first 0 before the first 1 in a succeeding row is in the same or subsequent column as the last 1 in the preceding row, the formation is forbidden. That is, if $Z_{j+1} \geqslant H_j$ the solution is forbidden. Similarly, if the last 0 before the first 1 in a preceding row is in the same or subsequent column as the last 1 in the succeeding row the formation is forbidden. That is, if $Z_j \geqslant H_{j+1}$ the solution is forbidden. These exclusionary rules can be stated as:

Rule (B) Do not proceed (B−1) if $Z_{j+1} \geqslant H_j$, or (B−2) if $Z_j \geqslant H_{j+1}$.

It can be seen that the proposed partial solution set forth in line 9 of Table II violates Rule (B−1) since both $Z_{j+1} = 1$ and $H_j = 1$ (that is, $Z_2 = 1$ and $H_1 = 1$. All solutions containing this formation are therefore precluded under provision of Rule (B−1) as set forth in the last column of line 9 in the table.

The solution proposed in line 10 of Table II is clearly forbidden since $Z_2 \geqslant H_1$ that is, the last 1 in the first row is in the first column and the first 1 in the second row is in the third column.

Since this clearly violates Rule (B–1) this formation and any solution containing it is forbidden. Since this formation is detected at the time that the $Z_2$ and $H_1$ values are identified there is no need to determine $H_2$ or the remainders $C_i$ which are therefore left blank in Table II.

These are all feasible positions for the set of 1's in row 2 for the condition $Z_1 = 0$, and step 2 of the technique now proceeds for the condition $Z_1 = 1$ to try all feasible positions for the set of 1's in the second row of the matrix. For reference, the remainders for condition $Z_1 = 1$ are recorded on line 11 of Table II. The first potential solution considered has $Z_1 = 1$ and $Z_2 = 0$ as illustrated in FIG. 14F. The set of 1's in the second row is therefore in the first three columns of the matrix and 1 is subtracted from each of the remainders from step 1 to provide remainders $C_i$ as shown at the bottom of FIG. 14 and in the Remainders columns of line 12 of Table II. This partial solution is therefore shown to be acceptable and is indicated by an asterisk in Table II. The next partial solution is considered and found acceptable as illustrated in line 13 in Table II. The proposed partial solution considered in line 14 of Table II violates Rule (B–1) since $Z_2 = 2$ and $H_1 = 2$, and therefore all subsequent solutions containing this formation are precluded in the same manner as pointed out hereinabove. Potential partial solutions for the condition $Z_1 = 2$ are made in the same manner as set forth on lines 16, 17, and 18 of Table II and all are found to include possibly valid solutions as indicated by the asterisks.

The proposed partial solution for the condition $Z_1 = 3$ and $Z_2 = 0$ provides an example of application of Rule (B–2) as seen on line 20 of Table II. The position of the last 1 in the second row as illustrated in FIG. 14G is in the third column ($H_2 = 3$) and the position of the last 0 before the first 1 in the first row is also in column 3 ($Z_1 = 3$). Therefore, since $Z_j \geq H_{j+1}$ that is, $Z_1 = 3 = H_2 = 3$, Rule (B–2) is violated and any potential solutions including this formation are precluded.

Partial solutions for the conditions $Z_1 = 3, Z_2 = 1$; and $Z_1 = 3, Z_2 = 2$ are considered in the above described manner and both are found to lead to possibly acceptable partial solutions as indicated on lines 21 and 22 of Table II. The potential solutions for the conditions $Z_1 = 4, Z_2 = 0$; and $Z_1 = 4, Z_2 = 1$ are rejected for violating Rule (B–2) since $Z_1 \geq H_2$. The potential solution for condition $Z_1 = 4, Z_2 = 2$ is conducted in a similar manner and it is found that this potential solution violates Rule (A) since a $-1$ appears in the last column $C_5$.

At this point, all possible partial solutions for positions of the sets of 1's in the first and second rows have been considered which completes step 2 of the technique. It can be seen that seven of the possible solutions considered in step 2 are found to be acceptable and eight of the potential solutions are forbidden by application of Rule (A) or Rule (B). Therefore, over half of the remaining potential solutions need not be further considered.

The solution then proceeds to step 3 which is substantially similar to step 2 except that all feasible positions of sets of 1's in the third row (that is value of $Z_3$) are considered for each of the acceptable combinations of $Z_1$ and $Z_2$ found in step 2. The remainders considered in step 3 are those found in operation of step 2 and no further requirement exists for memory or use of the remainders found at the end of step 1. In a computer implementation these are therefore erased and the memory units reused as may be required.

In step 3 the first trial partial solution has $Z_1 = 1, Z_2 = 0$ (which was found to be an acceptable partial solution as shown on line 12, Table II) and $Z_3 = 0$ as shown on line 28 of Table II and also in FIG. 14H. It is immediately seen that there are too many 1's in the first column for this to be an acceptable partial solution as indicated by the $-1$ obtained when 1 is subtracted from the first remainder $C_1$. The next partial solution considered is that for $Z_1 = 1, Z_2 = 0$, and $Z_3 = 1$ as set forth in line 29 of Table II. The set of 1's located in the third row are then subtracted from the remainders for state $Z_1 = 1$, $Z_2 = 0$ as determined in the second step and it is found that remainders $C_i$ are obtained which indicate an acceptable partial solution as indicated by the asterisk in line 29.

Step 3 then continues considering additional potential partial solutions for the acceptable partial solutions found in step 2 as set forth in lines 30 through 47 of Table II and it is found that, of the potential partial solutions considered in step 3, three acceptable solutions as indicated on lines 29, 31 and 32 are identified and the other eleven possibilities are precluded by application of the aforementioned rules.

Step 4 is substantially identical to the preceding steps 2 and 3 except that all feasible values of $Z_4$ are considered for the partial solutions identified as acceptable in step 3. In step 4 the remainders $C_i$ identified with the acceptable solutions in step 3 are employed and there is no further need for the remainders found in step 2 and these are also erased from the memory.

The first potential solution attempted in step 4 is illustrated in FIG. 14T and involves the condition wherein $Z_1 = 1, Z_2 = 0$, $Z_3 = 1$ and $Z_4 = 0$ as shown on line 49 of Table II. Although it is immediately apparent that the proposed solution illustrated in FIG. 14I violates both rules (A) and (B), this proposed solution is described to illustrate the third exclusionary rule employed in this technique for finding the region bounded by a closed curve. It will be recalled that one of the constraints on the closed curve is that there is no concavity in the curve in either the $x$ or $y$ direction. Concavity in the rows is accounted for by requiring all of the 1's to be in contiguous sets in the proposed solutions. The third exclusionary rule detects concavity in the columns and rejects all solutions including such a forbidden formation. It will be noted that the potential solution illustrated in FIG. 14T has a region of 1's having a concavity along the left side where a 0 in the third row is between 1's in the second and fourth rows. Such a concavity along the left side of the matrix is found from the $Z_j$ values and the calculation can be ceased at that point without any necessity of finding the $H_j$ and $C_i$ values for the proposed solution.

The rule for finding a concavity is based on the observation that the $Z_j$ value must remain constant or increase towards each side of the left-most point on the curve. The matrix selected for a particular problem has the left-most point on the curve at the margin so that $Z_j$ at that point is zero. The lack of concavity is therefore checked by assuring that the value of $Z_j$ on each side of the point where $Z_j = 0$ does not decrease; or this can be stated for any row beyond the row having the left-most extent of the curve as $Z_{j+1} - Z_j \geq 0$. Using $k$ for the value of $j$ where $Z_k = 0$, that is, the left-most point on the curve, the rule can be stated as:

Rule (C–1) Do not proceed unless $Z_{j+1} - Z_j \leq 0$ for $j \leq k$ where $Z_k = 0$, and $Z_{j+1} - Z_j \geq 0$ for $j \geq k$ where $Z_k = 0$.

A similar comparison is made to detect any forbidden concavity on the right side of the region in the matrix. In this case the position of the last 1 in successive rows is compared on each side of the row having the greatest right-most extent. At this point the furthest right 1 is the $m$ column, where $m$ is the full width of the matrix; that is, $H_n = m$. Thus the second half of the concavity rule can be stated as Rule (C–2) Do not proceed unless $H_{j+1} - H_j \geq 0$ for $j \leq n$ where $H_n = m$, and $H_{j+1} - H_j \leq 0$ for $j \geq n$.

Application of Rule (C–1) is seen in line 49 of Table II and in FIG. 14I. In that case $k = 2$ since $Z_2 = 0$. The values for $Z_{j+1} - Z_j$ are found for all values of $j$. Thus for $j = 1, Z_2 - Z_1 = -1$; for $j = 2, Z_3 - Z_2 = +1$; and for $j = 3, Z_4 - Z_3 = -1$. Now, according to Rule (C–1) $Z_2 - Z_1$ must be $\leq 0$ for the solution to proceed, and this is found to be the case since the value is $-1$. The value for $Z_3 - Z_2$ is, however, not $\leq 0$ since it is $+1$ and therefore the consideration of this possible solution cannot proceed since a forbidden structure has been identified. It should be noted that $Z_3 - Z_2$ satisfies the second equation of Rule (C–1) since it is greater than 0. In this particular example $Z_4 - Z_3$ is also $+1$ which violates the second equation of Rule (C–1) and also indicates that the calculation should not proceed.

In the potential solution of line 49 of Table II it is also seen that $Z_k = 0$ when $k = 4$. According to Rule (C–1) $Z_{j+1} - Z_j$ should be less than 0 for all values of $j$ less than 4. This is the case for $j = 1$ and $j = 3$ which are each equal to $-1$, however, for $j = 2$, $Z_3 - Z_2 = +1$ which indicates a forbidden formation in this potential solution and therefore the consideration should not proceed. This demonstrates that the rule is applicable for a situation where $k = 0$ at or near the edge of the matrix and the concavity appears at some spot remote from the $Z_k = 0$ row. It will be apparent that exactly the same procedure is employed in comparing the $H_j$ values for detecting a forbidden concavity on the right side of the matrix.

Proceeding in step 4, additional potential solutions are considered for each value of $Z_4$ for all feasible solutions identified in step 3. These considerations proceed in exactly the same manner as hereinabove pointed out for Rule 3 except that values for $Z_4$ and $H_4$ are varied and the remainders $C_i$ are compared with the appropriate remainders found in step 3. It will be seen from Table II that all of the potential solutions are eliminated because of a violation of either Rule (A) or Rule (B) with the sole exception of that solution set forth on line 52 of Table II. For this potential solution it should be noted that the remainders $C_1$ to $C_5$ are all zero which indicates that all of the columns are filled with the appropriate number of 1's corresponding to the $A_x$ values. The location of the 1's in the rows is defined, as hereinabove pointed out, by the $Z_j$ and $H_j$ values which give the column of the last zero before the first 1 at the left side and the position of the last 1 before the first zero on the right side thereby fully defining the location of the zeros and the 1's in the matrix. It will be seen by comparing this position with that illustrated in FIG. 14A that the solution is the same as the original region to be found.

In the exemplary solutions set forth in FIG. 14 and Table II only a single bounded region fits the $AA_x$ and $A_y$ values. In some cases, however, as in the problem set forth hereinabove in describing the superposition algorithm, more than one solution is possible. It is readily apparent that in employing a technique as hereinabove described wherein all potential solutions are considered that all of the region shapes are identified without application of anything similar to the Northwest Corner Rule. This technique has an additional advantage in the situation where no absolutely correct solution can be obtained due to round-off errors in the input data and the like which may lead to inconsistencies such as the possibility of both a 0 and a 1 in a given location. In order to resolve a situation where inconsistencies may occur it is only necessary to relax Rule (A) to the extent that a remainder of −1 is acceptable after subtraction. In this case the acceptable solutions are those having no more than a single −1 or a single +1 after the final step. It will be readily apparent that the same rationale is employed if a larger number of inconsistencies, for example, two −1's or a −2, could be tolerated in the remainders. Such a technique for handling inconsistencies not only has the advantage of identifying all possible approximate solutions but also verifies that there are no better solutions which might have been overlooked.

In addition to the alternative shape determination set forth hereinabove, it should be apparent to one skilled in the art that other solutions are readily achieved by programming a general purpose computer. Such solutions are feasibly made only with a computer because of the great number of calculations that must be made, rather than because of the complexity of the algorithms. Thus, for example, instead of digitizing the thickness profiles measured in the two directions, the curves of photographic density or the like can be approximated by fourth order equations that provide a fit to the profile with only a very small deviation. Computer techniques are available for optimizing such a curve fitting. The fourth order equations for the two thickness profiles can then be correlated by a technique of successive approximations to define a cross-sectional shape that yields a minimum deviation from the initial thickness profiles. Similarly a successive approximation technique can be employed to solve an integral equation in which the problem can be expressed by means of a Fourier transform.

MULTIPLE SHAPE RECONSTRUCTION

In some cases multiple regions, one inside the other, have unknown shapes, and it is desirable to determine such shapes. Thus, for example, the shape of a bone within flesh, and the marrow cavity within the bone may be of interest and the technique hereinabove described may be employed for determining the shape of not only the flesh but also the bone and marrow cavity within the bone. FIG. 19 illustrates a typical situation in which a first region bounded by a closed curve 55 of unknown shape contains within its boundaries a second closed curve 56 also of unknown shape. A two region problem is illustrated in FIG. 19, however, it will be apparent that the same principles can be employed for more complex problems having additional regions.

The two regions, which may represent cross sections of flesh and bone, for example, usually have different X-ray absorption coefficients or the like so that the characteristics of one of the regions bears a definite relation to the characteristics of the other region, which can be considered as a weighting factor. Thus, for example, if the weighting factor $w_1$ for the outer region has a value of 1 and the weighting factor $w_2$ of the inner region has a value of 2 each unit area of the cross section within the inner region will contribute twice as much apparent thickness difference (after transforming for nonlinear photographic effects as hereinabove described) in an X-ray exposure than does each unit area in the outer region. The different weighting factors for the separate regions may arise from differing X-ray absorptivities or may be from other physical characteristics of the media within the regions, however, their origin is of little significance in determining the shape according to the technique set forth hereinafter. Thus, for purposes of illustration, weighting factors $w_1$ and $w_2$ are employed herein for the two regions bounded by the closed curves 55 and 56, respectively.

The outer region is bounded by horizontal and vertical tangents to the curve 55 to define a basic rectangle $B_1C_1D_1E_1$ which has a height $m_1$ and a width $n_1$. The similarity of this arrangement to the typical solutions set forth hereinabove is apparent. In a similar manner the curve 56 defining the inner region is bounded by horizontal and vertical tangents to define its basic rectangle $B_2C_2D_2E_2$ with height $m_2$ and width $n_2$. The similarity of this to the shape reconstructed by the above stated algorithm is also apparent.

Thickness profiles of the region bounded by the outer curve 55 are found in substantially the same manner as set forth hereinabove such as, for example, by densitometer scans of X-ray images. Thickness profiles FGPIJ and KLQNO are obtained in the two orthogonal directions. The measured thickness profiles are thus humped curves, the $Ay$ curve, for example, being a composite of the profile FGHIJ for the outer region 55 and the profile GHIP for the inner region 56. Since the region within the inner closed curve 56 has a weighting factor $w_2$ of twice the weighting factor $w_1$ the thickness profile for the portion opposite the inner region will appear more dense than if the entire region within the curve 55 had the weighting factor $w_1$. The effect of this is seen in the thickness profiles FGPIJ and KLQNO which show a noticeable hump corresponding to the region with the greater weighting factor. The hump region GHIP is, of course, entirely due to the increased weighting factor of the region within the closed curve 56 and if the weighting factor $w_2$ were less than the weighting factor $w_1$ for the outer curve, there would be a depression from the thickness profile in a portion opposite the inner region. For purposes of determining shape it is considered that the entire region within the outer curve 55 is homogeneous and has a weighting factor $w_1$. The hump on the thickness profile is then due to the region within the inner curve 56 and the difference in weighting factors $w_2 - w_1$.

It will be apparent that in initially obtaining the thickness data $Ax$ and $Ay$ that the curves 55 and 56 are unknown and only the thickness profiles FGPIJ and KLQNO are obtained.

The problem is then to reconstruct the shape of the curve 55 and 56 from only the $A$ and $A_y$ data. When curves such as illustrated in FIG. 19 are obtained it is apparent that multiple regions are present because of the sharp discontinuities appearing at points G and I, for example. With these points and the points L and N the inner rectangle $B_2C_2D_2E_2$ can be layed out. It is also possible to lay out a reasonable curve GHI by interpolation to define the boundary of the $A_y$ data due to the outer region and the $A_y$ data for the inner region. The interpolation follows from the assumption that the region is homogeneous and the bump is due to the increased weighting $w_2-w_1$ of the inner region.

With the $A_x$ and $A_y$ data so separated both regions are quickly solved according to the algorithms set forth hereinabove in the separate matrices $B_1C_1D_1E_1$ and $B_2C_2D_2E_2$. The separate solutions may be superimposed if desired to show the shape of both regions in a single presentation. Thus the two separate regions are separately solved by the techniques described after the $A_x$ and $A_y$ data are graphically separated into thickness profiles of the two separate regions. It should be apparent that the accuracy of the shape reconstruction, particularly for the inner region, depends on the accuracy of the interpolation of the profile for the outer region. This is seldom a difficult matter however, since reasonable interpolations are usually accurate in actual situations encountered in practice. It will be apparent that the weighting factor of $w_2 = 2$ was merely selected for purposes of illustration and that other weighting factors may very well be involved such as, for example, in the case of bone and flesh, the weighting factor for bone is from three to eight times that of either flesh or marrow.

When the weighting factor for one of the regions, say the inner one $w_2$, is unknown the problem becomes somewhat more difficult but is clearly amenable of solution. In this situation not only the shape of the two curves 55 and 56 can be found, but also the unknown weighting factor $w_2$, when the basic rectangle $B_2C_2D_2E_2$ of the inner region is completely within the outer closed curve 55.

The number of spaces within the inner region having a weighting factor of $w_2$ in each column of the matrix is given by the equation $p_x = (A_x - m_2w_1/w_2 - w_1)$. It will be noted that $m_2$ is found from the points G and I of the $A_y$ data and that the $A_x$ value for the particular column is the measured input information. It is also assumed that $w_1$ is known and usually it is merely set equal to 1, therefore, $w_2$ and $p_x$ are unknowns in the equation. It may be more convenient to consider the equation as $w_2 - w_1 = A_x - m_2w_1/p_x$.

Now it is known that $p_x$ must be an integer since the curves are digitized and $p_x$ is $\geq m_2$; therefore, if $p_x$ is taken as equal to $m_2$ one has a lower limit for $w_2$. One then assumes a value for $w_2$ greater than or equal to this minimum and proceeds in the manner set forth hereinabove for multiple regions to solve for the shape of curves 55 and 56 according to the basic algorithm. When a solution is obtained the curves found are superimposed and $A_x$ and $A_y$ curves graphically obtained based on the assumed weighting factor $w_2$. Ordinarily on the first assumed $w_2$ this will not coincide with the measured $A_x$ and $A_y$ data and therefore a new assumption of the weighting factor $w_2$ will be required. Since the direction and approximate magnitude of the "error" in the assumed weighting factor is apparent from a comparison of the computed $A_x$ and $A_y$ curves and the measured $A_x$ and $A_y$ curves, the trial and error type of solution rapidly converges to provide not only the appropriate shapes for the curves 55 and 56 but also the true value of the weighting factor $w_2$.

It is found in typical situations that this process rapidly converges particularly when the weighting factor $w_2$ is relatively large compared with the weighting factor $w_1$. The accuracy of the solutions obtained have also been evaluated and it is found, for example, that two significant figures in the weighting factor are often obtained. Thus, for example, in one problem a weighting factor $w_2$ of 4.6 and a weighting factor $w_1$ of 1 were involved and an accurate solution was found for a weighting factor of 4.6 and quite apparent discrepancies between the calculated $A_x$ and $A_y$ curves and the measured $A_x$ and $A_y$ curves were noticeable for weighting factors $w_2$ of 4.5 or 4.7. It will be apparent that if there is uncertainty in the measured $A_x$ and $A_y$ values that there is uncertainty in both the shape of the two curves and also the unknown weighting factor $w_2$. It might also be noted that in most instances the approximate weighting factor is known either because of knowledge of the materials involved or because of experience by the operators. Thus, for example, a skilled X-ray diagnostician can quickly estimate the approximate density of a bone from an X-ray image.

What is claimed is:

1. A method of generating sets of data from which the shape of a cross-section of an object may be determined comprising the steps of:
   passing X-rays through the object in a first direction;
   passing X-rays through the object in a second direction;
   passing X-rays through a standard of known absorption;
   measuring X-ray intensity after passing through said standard for correlating X-ray intensity and absorption;
   measuring changes in X-ray intensity after passing through the object in the first direction along a plane parallel to the first and second directions for determining thickness of the object within the plane in the first direction;
   measuring changes in X-ray intensity after passing through the object in the second direction along said plane for determining thickness of the object within said plane in the second direction; and
   said standard of known absorption comprises:
   a first wedge having a first absorptivity, a substantially rectangular base, a pair of substantially rectangular faces intersecting at a first edge, and a pair of triangular faces;
   a second wedge having a second absorptivity, a substantially rectangular base, a pair of substantially rectangular faces intersecting at a second edge, and a pair of triangular faces, one of the substantially rectangular faces of said second wedge being substantially coterminous with one of the substantially rectangular faces of said first wedge and with said second edge lying along an edge of one of the triangular faces of said first wedge.

2. A method of generating sets of data from which the shape of a cross-section of an object may be determined comprising the steps of:
   passing a first X-ray beam through the object in a first direction and through a first wedge of material having a known absorption;
   passing a second X-ray beam through the object in a second direction, and through a second wedge of material having a known absorption;
   photographically recording the X-ray intensity after passing through said object and said first wedge in said first direction;
   photographically recording the X-ray intensity after passing through said object and said second wedge in said second direction
   measuring in movements photographic density as formed by said object on both recording and respective lines that lie within the same plane;
   measuring in movements photographic density as formed by said respective wedges in a direction of varying thickness of said wedge for for correlating photographic density and absorption;
   digitizing the changes in energy in increments along the first one of said lines in $A_x$ values representative of breadth of the object in the first direction;
   digitizing the changes in energy to increments along the second one of said lines in $A_y$ values representative of breadth of the object in the second direction;
   identifying at least one region bounded by a closed curve in a two dimensional matrix having a breadth in the first direction of m and a breadth in the second direction of n, said region having first and second breadth values corresponding to the digitized values representative of object breadth;

designating elements $A_{xy}$ of the matrix with the region by 1's;

designating elements $A_{xy}$ of the matrix without the region by 0's;

inserting a 1 in each element $A_{xy}$ where $(n - A_y + 1) \leq x \leq A_y$;

inserting a 1 in each element $A_{xy}$ where $(m - A_x + 1) \leq y \leq A_x$;

inserting a 0 in each element $A_{xy}$ where $1 \leq x \leq (x_{max} - A_y)$, where $x_{max}$ is the x coordinate of the highest matrix element occupied by a 1;

inserting an 0 in each element $A_{xy}$ where $1 \leq y \leq (y_{max} - A_x)$, where $y_{max}$ is the y coordinate of the furthest matrix element occupied by a 1;

inserting a 0 in each element $A_{xy}$ where $(y_{min} + A_y) \leq y \leq m$, where $y_{min}$ is the y coordinate of the nearest matrix element occupied by a 1;

inserting a 1 in each element $A_{xy}$ where $(n' - A_y + 1) \leq x \leq A_y$, where $n'$ equals n less the number of matrix elements in a matrix line occupied by a 0;

inserting a 1 in each element $A_{xy}$ where $(m' - A_x + 1) \leq y \leq A_x$, where $m'$ equals m less the number of matrix elements in a matrix line occupied by a 0; and repeating said inserting steps until substantially all of the matrix elements $A_{xy}$ are occupied by either 1 or a 0.

3. A process for measuring the shape of an object comprising the steps of:

passing energy through the object in a first direction whereby the energy transmitted through the object is related to the thickness at the region of transmission;

passing energy in a second direction whereby the energy transmitted through the object is related to the thickness at the region of transmission;

measuring along a first line the amount of energy transmitted through said object along a plane parallel to the radiating energy which is radiating along said first direction;

measuring along a second line said first and second directions the amount of energy transmitted through said object also along said plane which energy is radiating along said second direction said first and second lines both lying in said plane;

reconstructing the cross-sectional shape of the object in the said plane from both of said measuring steps.

4. A process as defined in claim 3 whereby said passing steps each comprise passing a beam of X-rays through said object; and said measuring steps each comprise measuring the transmitted X-ray intensity after passing through said object.

5. A process as defined in claim 4 each of said measuring steps further comprises:

photographically recording separately X-ray intensity after passing through said object from both directions;

measuring photographic density in increments along said respective lines, recordings; and said reconstructing step further comprises:

converting photographic density to breadth of said object in both said first and second directions within said plane.

6. A process as defined in claim 3 wherein said reconstructing step further comprises:

digitizing the changes in energy in increments along the first line in values representative of breadth of the object in the first direction in the common plane;

digitizing the changes in energy in increments along the second line in values representative of breadth of the object in the second direction in the common plane; and identifying at least one region bounded by a closed curve in a two dimensional matrix, said region having first and second breadth values corresponding to the digitized values representative of object breadth.

7. A process as defined in claim 6 wherein said identifying step comprises:

repetitively tentatively placing the digitized values of change in the first direction as first contiguous sets of elements in rows of the matrix, each of said sets having a number of elements corresponding to a digitized value;

repetitively comparing the tentative row position with digitized values of change in the second direction considered as second contiguous sets of elements in columns of the matrix to establish acceptable locations of contiguous sets in both rows and columns within the region bounded by a closed curve.

8. A process as defined in claim 7 wherein said placing steps successively place the first sets in all feasible positions in successive rows; and said comparing steps comprise eliminating unacceptable locations of first contiguous sets from further tentative placing steps.

9. A process as defined in claim 8 wherein said comparing step comprises:

reducing the number of elements in the second sets an amount corresponding to locations in columns occupied by elements of the first contiguous sets, and eliminating locations as unacceptable when the reduced value is less than a preselected minimum.

10. A process as defined in claim 6 wherein said identifying step comprises:

identifying a first sub-region within the matrix necessarily within said region;

identifying a second sub-region within the matrix necessarily without said region; and iterating the identifying steps alternately until the intersection of subregions determines said region.

11. A process as defined in claim 10 wherein said step of identifying the first sub-region comprises:

arraying the digitized values as parallel contiguous sets of elements adjacent opposite margins of the matrix; and combining said sets of elements for identifying a sub-region wherein elements of sets adjacent one margin overlap elements of sets adjacent the opposite margin.

12. A process as defined in claim 11 wherein said steps of identifying the second sub-region comprises:

overlapping contiguous sets of elements with the first sub-region necessarily within said region so that one end of a contiguous set of elements in a line coincides with an edge of the first sub-region; and identifying matrix elements beyond the opposite end of the contiguous set of elements as the second sub-region necessarily without said region.

13. A process as defined in claim 6 wherein elements of the matrix within the region are designated by proven 1's, elements of the matrix without the region are designated by proven 0's and the digitized values representative of breadth of the object of each matrix line are designated by a contiguous set of 1's, and wherein the identifying step comprises:

inserting proven 1's in those spaces where the set of 1's in the respective line adjacent one margin overlaps the same set of 1's adjacent the opposite margin at the center of all lines in which more than half the length is occupied by the set of 1's; and inserting proven 0's at the ends of those lines where proven 1's have been inserted by a previous inserting step, and the set of 1's in the respective line cannot extend to the margin from the most remote proven 1 in that line.

14. A process as defined in claim 13 further comprising:

inserting proven 1's in those spaces where the set of 1's in a respective line plus the sum of all proven 0's in the same line, adjacent one margin overlaps the same set of 1's and sum of all proven 0's, adjacent the opposite margin on all lines in which more than half of the length is occupied by the sum of all proven 0's in the line plus the set of 1's in the line; and iterating the latter two inserting steps alternately until no further proven 0's or proven 1's are obtained.

15. A process as defined in claim 14 further comprising:
inserting proven 1's in those unoccupied spaces occurring in the same line between spaces occupied by proven 1's;
inserting proven 0's in those unoccupied spaces that occur between the margin of the matrix and a space occupied by a proven 0, or between two proven 0's in the same line if the number of unoccupied spaces therebetween is insufficient to accomodate the set of 1's occurring in that line;
inserting proven 0's in all unoccupied spaces in a line if the number of proven 1's equals the set of 1's for that line; and
inserting proven 1's in all unoccupied spaces in a line if the number of proven 0's in the line equals the matrix breadth less the set of 1's in the line.

16. A process as defined in claim 3 further including the steps of:
measuring the amount of energy transmitted through said object along a plurality of planes parallel to said plane;
reconstructing more than one of said cross-sectional shapes in respective parallel planes; and
combining said cross-sectional shapes to reconstruct the three dimensional shape.

17. A method of generating sets of data from which the shape of a cross-section of an object may be determined comprising the steps of:
passing energy through the object in a first direction, at the same time passing the energy through a first wedge wherein the wedge is disposed so that the energy passes through different thicknesses thereof;
comparing changes in energy that passed through the object in the first direction with the changes in energy passed through the first wedge for determining thickness of the object in the first direction along a plane parallel to the first direction;
passing energy through the object in a second direction that is also parallel to the plane and at the same time passing therethrough a second wedge wherein the second wedge is disposed so that the energy passes through different thicknesses thereof; and comparing changes in energy passed in the second direction through the object with changes in energy passed through the second wedge for determining thickness of the object in the second direction also along said plane.

* * * * *